US010379904B2

(12) United States Patent
Weissmann et al.

(10) Patent No.: US 10,379,904 B2
(45) Date of Patent: Aug. 13, 2019

(54) CONTROLLING A PERFORMANCE STATE OF A PROCESSOR USING A COMBINATION OF PACKAGE AND THREAD HINT INFORMATION

(71) Applicant: Intel Corporation, Santa Clara, CA (US)

(72) Inventors: Eliezer Weissmann, Haifa (IL); Israel Hirsh, Kiryat Motzkin (IL); Efraim Rotem, Haifa (IL); Doron Rajwan, Rishon le-Zion (IL); Avinash N. Ananthakrishnan, Portland, OR (US); Natanel Abitan, Beit Yitzhak (IL); Ido Melamed, Kfar-Saba (IL); Guy M. Therien, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 210 days.

(21) Appl. No.: 15/252,511

(22) Filed: Aug. 31, 2016

(65) Prior Publication Data

US 2018/0060123 A1 Mar. 1, 2018

(51) Int. Cl.
*G06F 9/46* (2006.01)
*G06F 1/32* (2019.01)
(Continued)

(52) U.S. Cl.
CPC .............. *G06F 9/4893* (2013.01); *G06F 1/32* (2013.01); *G06F 9/48* (2013.01); *G06F 9/485* (2013.01); *G06F 9/4806* (2013.01); *G06F 9/4843* (2013.01); *G06F 9/4881* (2013.01); *G06F 9/50* (2013.01); *G06F 9/5005* (2013.01);
(Continued)

(58) Field of Classification Search
CPC ........ G06F 9/48; G06F 9/4806; G06F 9/4843; G06F 9/485; G06F 9/4881; G06F 9/4893; G06F 9/50; G06F 9/5005; G06F 9/5011; G06F 9/5016; G06F 9/5022;
(Continued)

(56) References Cited

U.S. PATENT DOCUMENTS 5,163,153 A 11/1992 Cole et al.
5,522,087 A 5/1996 Hsiang
(Continued)

FOREIGN PATENT DOCUMENTS

EP 1 282 030 A1 5/2003

OTHER PUBLICATIONS

International Searching Authority, "Notification of Transmittal of the International Search Report and the Written Opinion of the International Searching Authority," dated Nov. 10, 2017, in International application No. PCT/US2017/045257.
(Continued)

*Primary Examiner* — Charles M Swift
(74) *Attorney, Agent, or Firm* — Trop, Pruner & Hu, P.C.

(57) ABSTRACT

In one embodiment, a processor includes: a first storage to store a set of common performance state request settings; a second storage to store a set of thread performance state request settings; and a controller to control a performance state of a first core based on a combination of at least one of the set of common performance state request settings and at least one of the set of thread performance state request settings. Other embodiments are described and claimed.

19 Claims, 20 Drawing Sheets

1700

Receive And Store Processor Performance State Control Parameters In First Configuration Storage 1710

Receive And Store Thread Performance State Control Parameters In Second Configuration Storage 1720

Receive And Store Thread Valid Indicators In Valid Field Of Second Configuration Storage 1730

All Thread Valid Indicators Set? 1740

Y: Determine Performance State For Core Based On Thread Performance State Control Parameters 1750

N: All Thread Valid Indicators Reset? 1760

Y: Determine Performance State For Core Based On Processor Performance State Control Parameters 1770

N: Determine Performance State For Core Based On Combination Of Thread Performance State Control Parameters And Processor Performance State Control Parameters 1780

(51) Int. Cl.
*G06F 9/48* (2006.01)
*G06F 9/50* (2006.01)

(52) U.S. Cl.
CPC ............ *G06F 9/505* (2013.01); *G06F 9/5011* (2013.01); *G06F 9/5016* (2013.01); *G06F 9/5022* (2013.01); *G06F 9/5027* (2013.01); *G06F 9/5044* (2013.01); *G06F 9/5094* (2013.01); *Y02D 10/24* (2018.01)

(58) Field of Classification Search
CPC ...... G06F 9/5027; G06F 9/5044; G06F 9/505; G06F 9/5094; G06F 1/32
See application file for complete search history.

(56) References Cited

U.S. PATENT DOCUMENTS 5,590,341 A 12/1996 Matter
5,621,250 A 4/1997 Kim
5,931,950 A 8/1999 Hsu
6,748,546 B1 6/2004 Mirov et al.
6,792,392 B1 9/2004 Knight
6,823,516 B1 11/2004 Cooper
6,829,713 B2 12/2004 Cooper et al.
6,996,728 B2 2/2006 Singh
7,010,708 B2 3/2006 Ma
7,043,649 B2 5/2006 Terrell
7,093,147 B2 8/2006 Farkas et al.
7,111,179 B1 9/2006 Girson et al.
7,194,643 B2 3/2007 Gonzalez et al.
7,272,730 B1 9/2007 Acquaviva et al.
7,412,615 B2 8/2008 Yokota et al.
7,434,073 B2 10/2008 Magklis
7,437,270 B2 10/2008 Song et al.
7,454,632 B2 11/2008 Kardach et al.
7,529,956 B2 5/2009 Stufflebeam
7,539,885 B2 5/2009 Ma
7,730,340 B2 6/2010 Hu et al.
8,190,863 B2* 5/2012 Fossum ................ G06F 1/3203 712/229
8,813,080 B2* 8/2014 Fenger ................. G06F 9/4893 718/100
9,619,284 B2* 4/2017 Sakarda ............... G06F 9/4893
9,632,822 B2* 4/2017 Chang .................. G06F 9/4843
2001/0044909 A1 11/2001 Oh et al.
2002/0194509 A1 12/2002 Plante et al.
2003/0061383 A1 3/2003 Zilka
2004/0064752 A1 4/2004 Kazachinsky et al.
2004/0098560 A1 5/2004 Storvik et al.
2004/0139356 A1 7/2004 Ma
2004/0268166 A1 12/2004 Farkas et al.
2005/0022038 A1 1/2005 Kaushik et al.
2005/0033881 A1 2/2005 Yao
2005/0132238 A1 6/2005 Nanja
2006/0005082 A1* 1/2006 Fossum ................ G06F 1/3203 714/42
2006/0050670 A1 3/2006 Hillyard et al.
2006/0053326 A1 3/2006 Naveh
2006/0059286 A1 3/2006 Bertone et al.
2006/0069936 A1 3/2006 Lint et al.
2006/0117202 A1 6/2006 Magklis et al.
2006/0184287 A1 8/2006 Belady et al.
2006/0236135 A1* 10/2006 Jones ....................... G06F 1/32 713/300
2006/0236136 A1 10/2006 Jones et al.
2007/0005995 A1 1/2007 Kardach et al.
2007/0016817 A1 1/2007 Albonesi et al.
2007/0079294 A1 4/2007 Knight
2007/0106827 A1 5/2007 Boatright et al.
2007/0156992 A1 7/2007 Jahagirdar
2007/0214342 A1 9/2007 Newburn
2007/0239398 A1 10/2007 Song et al.
2007/0245163 A1 10/2007 Lu et al.
2008/0028240 A1 1/2008 Arai et al.
2008/0134185 A1* 6/2008 Fedorova ............. G06F 9/4881 718/102
2008/0201561 A1* 8/2008 Bates ..................... G06F 9/463 712/228
2008/0250260 A1 10/2008 Tomita
2009/0006871 A1 1/2009 Liu et al.
2009/0007120 A1* 1/2009 Fenger ................. G06F 9/4893 718/102
2009/0089562 A1* 4/2009 Schuchman .......... G06F 1/3203 712/228
2009/0089782 A1* 4/2009 Johnson ............... G06F 1/3203 718/100
2009/0150695 A1 6/2009 Song et al.
2009/0150696 A1 6/2009 Song et al.
2009/0158061 A1 6/2009 Schmitz et al.
2009/0158067 A1 6/2009 Bodas et al.
2009/0172375 A1 7/2009 Rotem et al.
2009/0172428 A1 7/2009 Lee
2009/0235105 A1 9/2009 Branover et al.
2009/0249094 A1 10/2009 Marshall et al.
2009/0313623 A1* 12/2009 Coskun .................. G06F 9/505 718/100
2009/0328058 A1* 12/2009 Papaefstathiou ....... G06F 9/485 718/107
2010/0115309 A1 5/2010 Carvalho et al.
2010/0146513 A1 6/2010 Song
2010/0191997 A1 7/2010 Dodeja et al.
2011/0154090 A1 6/2011 Dixon et al.
2011/0307730 A1* 12/2011 Marshall .............. G06F 1/3203 713/324
2012/0079290 A1 3/2012 Kumar
2012/0246506 A1 9/2012 Knight
2012/0284729 A1* 11/2012 Sharda ................. G06F 9/5094 718/104
2013/0047011 A1 2/2013 Dice et al.
2013/0061064 A1 3/2013 Ananthakrishnan et al.
2013/0080803 A1 3/2013 Ananthakrishnan et al.
2013/0080804 A1 3/2013 Ananthakrishnan et al.
2013/0111120 A1 5/2013 Ananthakrishnan et al.
2013/0111121 A1 5/2013 Ananthakrishnan et al.
2013/0111226 A1 5/2013 Ananthakrishnan et al.
2013/0111236 A1 5/2013 Ananthakrishnan et al.
2013/0346774 A1 12/2013 Bhandaru et al.
2014/0068284 A1* 3/2014 Bhandaru ................ G06F 1/26 713/300
2014/0068290 A1 3/2014 Bhandaru et al.
2014/0195829 A1 7/2014 Bhandaru et al.
2014/0208141 A1 7/2014 Bhandaru et al.
2014/0229750 A1 8/2014 Bhandaru et al.
2014/0325520 A1* 10/2014 Bacchus ............... G06F 9/5016 718/104
2015/0355700 A1 12/2015 Pusukuri et al.
2016/0092274 A1* 3/2016 Singh .................... G06F 9/5027 718/104
2016/0335132 A1* 11/2016 Ash ......................... G06F 9/505
2018/0101414 A1* 4/2018 Ash ....................... G06F 9/5083

OTHER PUBLICATIONS

Intel Developer Forum, IDF2010, Opher Kahn, et al., "Intel Next Generation Microarchitecture Codename Sandy Bridge: New Processor Innovations," Sep. 13, 2010, 58 pages.
SPEC—Power and Performance, Design Overview V1.10, Standard Performance Information Corp., Oct. 21, 2008, 6 pages.
Intel Technology Journal, "Power and Thermal Management in the Intel Core Duo Processor," May 15, 2006, pp. 109-122.
Anoop Iyer, et al., "Power and Performance Evaluation of Globally Asynchronous Locally Synchronous Processors," 2002, pp. 1-11.
Greg Semeraro, et al., "Hiding Synchronization Delays in a GALS Processor Microarchitecture," 2004, pp. 1-13.
Joan-Manuel Parcerisa, et al., "Efficient Interconnects for Clustered Microarchitectures," 2002, pp. 1-10.
Grigorios Magklis, et al., "Profile-Based Dynamic Voltage and Frequency Scalling for a Multiple Clock Domain Microprocessor," 2003, pp. 1-12.
Greg Semeraro, et al., "Dynamic Frequency and Voltage Control for a Multiple Clock Domain Architecture," 2002, pp. 1-12.

(56) References Cited

OTHER PUBLICATIONS

Greg Semeraro, "Energy-Efficient Processor Design Using Multiple Clock Domains with Dynamic Voltage and Frequency Scaling," 2002, pp. 29-40.
Diana Marculescu, "Application Adaptive Energy Efficient Clustered Architectures," 2004, pp. 344-349.
L. Benini, et al., "System-Level Dynamic Power Management," 1999, pp. 23-31.
Ravindra Jejurikar, et al., "Leakage Aware Dynamic Voltage Scaling for Real-Time Embedded Systems," 2004, pp. 275-280.
Ravindra Jejurikar, et al., "Dynamic Slack Reclamation With Procrastination Scheduling in Real-Time Embedded Systems," 2005, pp. 13-17.
R. Todling, et al., "Some Strategies for Kalman Filtering and Smoothing," 1996, pp. 1-21.
R.E. Kalman, "A New Approach to Linear Filtering and Prediction Problems," 1960, pp. 1-12.
Intel Corporation, "Intel 64 and IA-32 Architectures Software Developer's Manual," vol. 3 (3A, 3B & 3C): System Programming Guide, Feb. 2014, Chapter 14 Power and Thermal Management (14.1-14.9.5), 44 pages.
Intel Corporation, "Intel 64 and IA-32 Architectures Software Developer's Manual," vol. 3B: System Programming Guide, Part 2, Apr. 2016, Chapter 14 Power and Thermal Management (14.1-14.9.5), 42 pages.

* cited by examiner

200

CONTROLLING A PERFORMANCE STATE OF A PROCESSOR USING A COMBINATION OF PACKAGE AND THREAD HINT INFORMATION

FIELD OF INVENTION

Embodiments relate to power management of a system, and more particularly to power management of a multicore processor.

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc. become even more prevalent (from inclusion in the typical computer, automobiles, and televisions to biotechnology).

DETAILED DESCRIPTION

Figure 1:
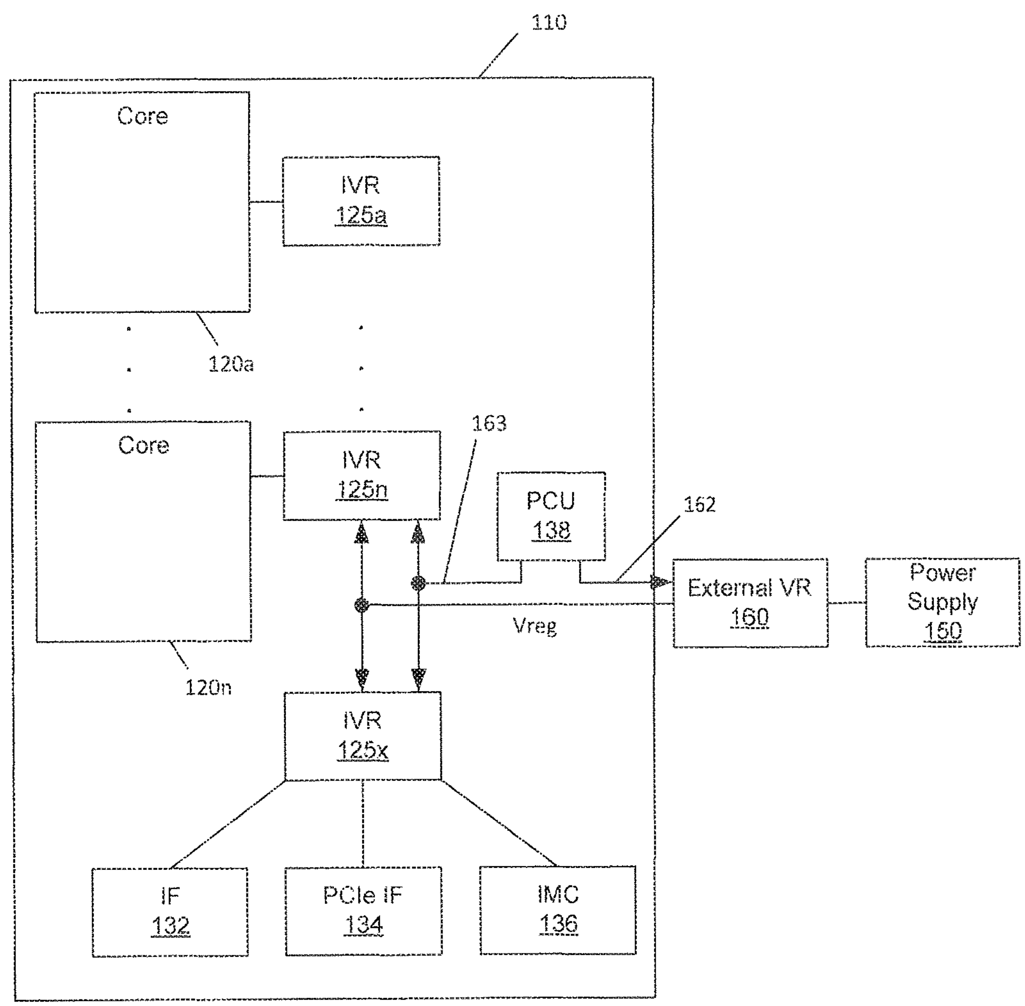
FIG. 1 is a block diagram of a portion of a system in accordance with an embodiment of the present invention.

In various embodiments, a processor is configured to enable a power controller of the processor to receive and use performance state hint information from one or more threads along with package-level performance state hint information in determining appropriate performance states for the processor. More specifically, embodiments provide the ability for the power controller to determine performance state based at least in part on controllable combinations of thread-level and package-level performance state hint information. To this end, the power controller is configured to control a performance state of one or more physical cores (and/or other hardware logic) of the processor based at least in part on this combination of information.

In embodiments, a thread-specific performance state hint may be used to override a corresponding package performance state hint. Such thread information can be saved and restored together with other context of the thread. In order to enable a combination usage model as described herein, thread validity information may be associated with the thread performance state hint information to indicate whether to use thread-level hint information, and if so, which particular parameters of this information to use. Although the scope of the present invention is not limited in this regard, in one embodiment a set of configuration storages of a processor such as one or more machine specific registers (MSRs) or other storages can be used to store the package-level and thread-level performance state hint information and corresponding override/validity control information. As another example, software thread performance hints may be set and restored into a user-level thread using instructions such as XSAVE and XRSTOR instructions, such that these instructions provide the capability to support this type of context. In an embodiment, a scheduler of the OS that schedules this user-level thread may execute such instructions to save/restore this information.

In contrast, without an embodiment a power controller may only use performance state hint information from one source, either operating system (OS) package setting or thread. This situation can lead to complexity where a given thread seeks to override OS package control such as when a thread is swapped or terminated using complicated semaphores to synchronize settings of different threads.

In one example usage model, an OS may be configured to limit an ability of a thread or logical processor (note the terms "thread" and "logical processor" are used interchangeably herein) from controlling particular fields of hint information. Note that in addition to traditional core-based threads, embodiments apply equally to other computation tasks such as graphics processing, imaging, media processing and so forth. Still further, MSRs and thread-based performance state hint information may be for cores, graphics processors, cameras and other intellectual property (IP) logic blocks of a processor. In an embodiment, the OS may control thread validity indicators to identify for which fields thread performance state hint information may (or may not) be used. Thus using an embodiment, a true combination usage model can be realized that flexibly combines information of logical processor and common package requests. As such, there is no need to trigger any logical processor while the common package request is reset to update shared request fields. Embodiments may be especially applicable when the OS has the ability to set part of the performance state hints at the level of the thread and the rest are common, and may be set at the level of all threads/package.

In an embodiment, an OS can use a first configuration register to set one or more common performance state control variables that can be affected by a platform's current status, e.g., whether the system is battery or AC powered, system thermal limitations, minimal expected quality of service (QoS), and so forth. In addition to these common settings, each thread may define its usage parameters, e.g., using a second configuration register to set one or more thread-level performance state control variables. In addition, package control and validity indicators can be provided to enable an appropriate combination of package and thread-level performance state hint information to be used in making performance state decisions.

For example, a background thread can enable a lower QoS value and better power savings than the common settings. Such background threads can include tasks that do not implicate user interaction, as an example. In turn, real-time threads involving user interaction such as screen touch and so forth can request higher performance settings. All of these requests can be supported by setting performance state hint information on a per logical processor basis.

In an embodiment, the OS can set the thread-specific settings as part of a thread context switch. The OS may also set only a subset of thread performance state hint information parameters while other parameters are controlled globally, avoiding synchronization overhead. As an example, common settings can be used for threads that have no specific requirement (for a given parameter). For other parameters, it is possible to use thread-defined settings. Using an embodiment, a processor can enable each logical processor to operate at an appropriate performance state that meets current execution thread needs. Thus using an embodiment, better thread-based power/performance tuning can be realized, to achieve greater power performance results.

Note that software (e.g., OS or driver) may provide these hints to the processor, e.g., determining thread QoS requirements and setting the MSR according to this requirement. In an embodiment, a software application can perform power control unit tasks to determine the appropriate performance state. Such operation may especially occur for non-core computation engines such as a graphics processor. In some cases a distributed scheme may occur where one software such as OS or BIOS sets the hints in the processor package configuration register and a user application sets the hints in the thread configuration register.

Embodiments are applicable to simultaneous multi-threading (SMT) processors. In the case of two or more threads using the same physical core, an additional level of coordination may apply. For example, all threads on a single core may be consolidated by some rule to be treated as a single thread. In one embodiment, a logical-OR operation may be performed to consolidate all thread valid bits that use the same physical core. Or a rule of maximum QoS may be used to select an appropriate thread's value for use. Thus in some embodiments, another level of consolidation/synchronization may be applied (such as combining multiple threads' information before combining with the package-based information). Such consolidation may be performed where multiple physical cores are tied to a cluster for sharing, e.g., the same voltage and frequency.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems. That is, disclosed embodiments can be used in many different system types, ranging from server computers (e.g., tower, rack, blade, micro-server and so forth), communications systems, storage systems, desktop computers of any configuration, laptop, notebook, and tablet computers (including 2:1 tablets, phablets and so forth), and may be also used in other devices, such as handheld devices, systems on chip (SoCs), and embedded applications. Some examples of handheld devices include cellular phones such as smartphones, Internet protocol devices, digital cameras, personal digital assistants (PDAs), and handheld PCs. Embedded applications may typically include a microcontroller, a digital signal processor (DSP), network computers (NetPC), set-top boxes, network hubs, wide area network (WAN) switches, wearable devices, or any other system that can perform the functions and operations taught below. More so, embodiments may be implemented in mobile terminals having standard voice functionality such as mobile phones, smartphones and phablets, and/or in non-mobile terminals without a standard wireless voice function communication capability, such as many wearables, tablets, notebooks, desktops, micro-servers, servers and so forth. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future, such as for power conservation and energy efficiency in products that encompass a large portion of the US economy.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage Vreg to processor 110.

As seen, processor 110 may be a single die processor including multiple cores 120*a*-120*n*. In addition, each core may be associated with an integrated voltage regulator (IVR) 125*a*-125*n* which receives the primary regulated voltage and generates an operating voltage to be provided to one or more agents of the processor associated with the IVR.

Accordingly, an IVR implementation may be provided to allow for fine-grained control of voltage and thus power and performance of each individual core. As such, each core can operate at an independent voltage and frequency, enabling great flexibility and affording wide opportunities for balancing power consumption with performance. In some embodiments, the use of multiple IVRs enables the grouping of components into separate power planes, such that power is regulated and supplied by the IVR to only those components in the group. During power management, a given power plane of one IVR may be powered down or off when the processor is placed into a certain low power state, while another power plane of another IVR remains active, or fully powered. Similarly, cores 120 may include or be associated with independent clock generation circuitry such as one or more phase lock loops (PLLs) to control operating frequency of each core 120 independently.

Still referring to FIG. 1, additional components may be present within the processor including an input/output interface (IF) 132, another interface 134, and an integrated memory controller (IMC) 136. As seen, each of these components may be powered by another integrated voltage regulator 125$_x$. In one embodiment, interface 132 may enable operation for an Intel® Quick Path Interconnect (QPI) interconnect, which provides for point-to-point (PtP) links in a cache coherent protocol that includes multiple layers including a physical layer, a link layer and a protocol layer. In turn, interface 134 may communicate via a Peripheral Component Interconnect Express (PCIe™) protocol.

Also shown is a power control unit (PCU) 138, which may include circuitry including hardware, software and/or firmware to perform power management operations with regard to processor 110. As seen, PCU 138 provides control information to external voltage regulator 160 via a digital interface 162 to cause the voltage regulator to generate the appropriate regulated voltage. PCU 138 also provides control information to IVRs 125 via another digital interface 163 to control the operating voltage generated (or to cause a corresponding IVR to be disabled in a low power mode). In various embodiments, PCU 138 may include a variety of power management logic units to perform hardware-based power management, including the control of performance states using combined information from package and thread performance state management hints. As will be described, depending upon controls provided, PCU 138 may determine a performance state for one or more cores based on a combination of hints from these two sources. In other modes of operation, PCU 138 may determine a performance state based at least in part on the hints from only one such source. Such power management may be wholly processor controlled (e.g., by various processor hardware, and which may be triggered by workload and/or power, thermal or other processor constraints) and/or the power management may be performed responsive to external sources (such as a platform or power management source or system software).

In FIG. 1, PCU 138 is illustrated as being present as a separate logic of the processor. In other cases PCU logic 138 may execute on a given one or more of cores 120. In some cases, PCU 138 may be implemented as a microcontroller (dedicated or general-purpose) or other control logic configured to execute its own dedicated power management code, sometimes referred to as P-code. In yet other embodiments, power management operations to be performed by PCU 138 may be implemented externally to a processor, such as by way of a separate power management integrated circuit (PMIC) or other component external to the processor. In yet other embodiments, power management operations to be performed by PCU 138 may be implemented within BIOS or other system software.

Embodiments may be particularly suitable for a multicore processor in which each of multiple cores can operate at an independent voltage and frequency point. As used herein the term "domain" is used to mean a collection of hardware and/or logic that operates at the same voltage and frequency point. In addition, a multicore processor can further include other non-core processing engines such as fixed function units, graphics engines, and so forth. Such processor can include independent domains other than the cores, such as one or more domains associated with a graphics engine (referred to herein as a graphics domain) and one or more domains associated with non-core circuitry, referred to herein as an uncore or a system agent. Although many implementations of a multi-domain processor can be formed on a single semiconductor die, other implementations can be realized by a multi-chip package in which different domains can be present on different semiconductor die of a single package.

While not shown for ease of illustration, understand that additional components may be present within processor 110 such as uncore logic, and other components such as internal memories, e.g., one or more levels of a cache memory hierarchy and so forth. Furthermore, while shown in the implementation of FIG. 1 with an integrated voltage regulator, embodiments are not so limited. For example, other regulated voltages may be provided to on-chip resources from external voltage regulator 160 or one or more additional external sources of regulated voltages.

Note that the power management techniques described herein may be independent of and complementary to an operating system (OS)-based power management (OSPM) mechanism. According to one example OSPM technique, a processor can operate at various performance states or levels, so-called P-states, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic, overclocking, or turbo mode state in which, when power and/or thermal budget is available, processor hardware can configure the processor or at least portions thereof to operate at a higher than guaranteed frequency. In many implementations a processor can include multiple so-called bin frequencies above the P1 guaranteed maximum frequency, exceeding to a maximum peak frequency of the particular processor, as fused or otherwise written into the processor during manufacture. In addition, according to one OSPM mechanism, a processor can operate at various power states or levels. With regard to power states, an OSPM mechanism may specify different power consumption states, generally referred to as C-states, C0 , C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

Understand that many different types of power management techniques may be used individually or in combination in different embodiments. As representative examples, a power controller may control the processor to be power managed by some form of dynamic voltage frequency scaling (DVFS) in which an operating voltage and/or operating frequency of one or more cores or other processor logic may be dynamically controlled to reduce power consumption in certain situations. In an example, DVFS may be performed using Enhanced Intel SpeedStep™ technology available from Intel Corporation, Santa Clara, Calif., to provide optimal performance at a lowest power consumption level. In another example, DVFS may be performed using Intel TurboBoost™ technology to enable one or more cores or other compute engines to operate at a higher than guaranteed operating frequency based on conditions (e.g., workload and availability).

Another power management technique that may be used in certain examples is dynamic swapping of workloads between different compute engines. For example, the processor may include asymmetric cores or other processing engines that operate at different power consumption levels, such that in a power constrained situation, one or more workloads can be dynamically switched to execute on a lower power core or other compute engine. Another exemplary power management technique is hardware duty cycling (HDC), which may cause cores and/or other compute engines to be periodically enabled and disabled according to a duty cycle, such that one or more cores may be made inactive during an inactive period of the duty cycle and made active during an active period of the duty cycle.

Power management techniques also may be used when constraints exist in an operating environment. For example, when a power and/or thermal constraint is encountered, power may be reduced by reducing operating frequency and/or voltage. Other power management techniques include throttling instruction execution rate or limiting scheduling of instructions. Still further, it is possible for instructions of a given instruction set architecture to include express or implicit direction as to power management operations. Although described with these particular examples, understand that many other power management techniques may be used in particular embodiments.

Figure 2:
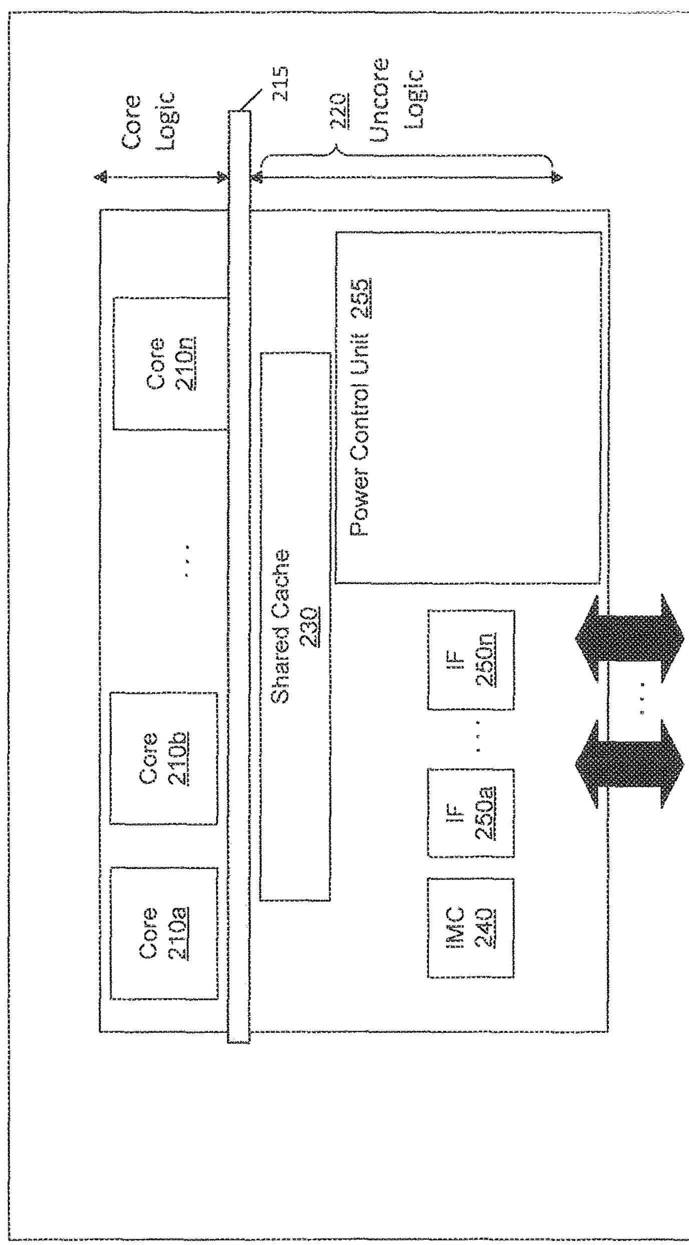
FIG. 2 is a block diagram of a processor in accordance with an embodiment of the present invention.

Embodiments can be implemented in processors for various markets including server processors, desktop processors, mobile processors and so forth. Referring now to FIG. 2, shown is a block diagram of a processor in accordance with an embodiment of the present invention. As shown in FIG. 2, processor 200 may be a multicore processor including a plurality of cores $\mathbf{210}_a$-$\mathbf{210}_n$. In one embodiment, each such core may be of an independent power domain and can be configured to enter and exit active states and/or maximum performance states based on workload. One or more cores 210 may be heterogeneous to the other cores, e.g., having different micro-architectures, instruction set architectures, pipeline depths, power and performance capabilities. The various cores may be coupled via an interconnect 215 to a system agent or uncore 220 that includes various components. As seen, the uncore 220 may include a shared cache 230 which may be a last level cache. In addition, the uncore may include an integrated memory controller 240 to communicate with a system memory (not shown in FIG. 2), e.g., via a memory bus. Uncore 220 also includes various interfaces 250 and a power control unit 255, which may include logic to perform the power management techniques described herein. To this end, power control unit 255 may receive incoming hint information from package and thread sources and determine an appropriate performance state for one or more cores 210 or other logic of the processor based on the hints from one source only or a combination of sources, depending upon the indicated control.

In addition, by interfaces 250*a*-250*n*, connection can be made to various off-chip components such as peripheral devices, mass storage and so forth. While shown with this particular implementation in the embodiment of FIG. 2, the scope of the present invention is not limited in this regard.

Figure 3:
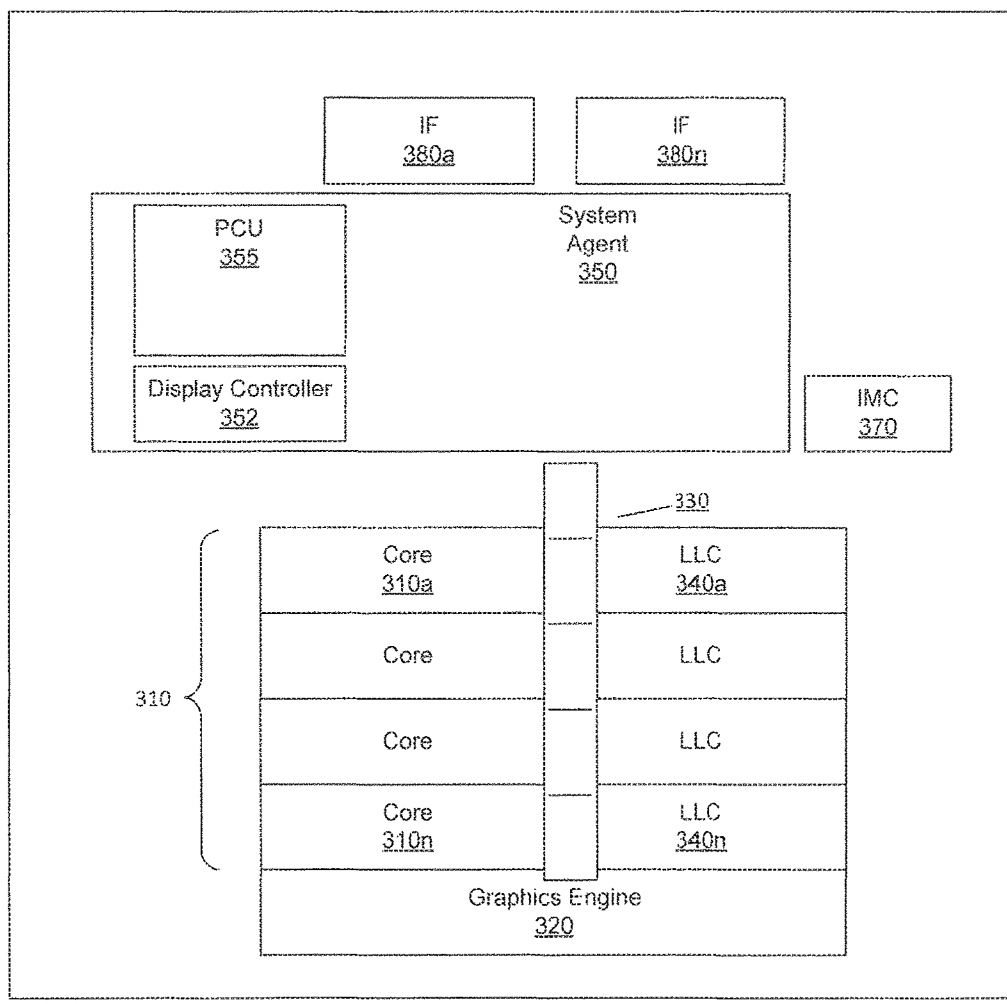
FIG. 3 is a block diagram of a multi-domain processor in accordance with another embodiment of the present invention.

Referring now to FIG. 3, shown is a block diagram of a multi-domain processor in accordance with another embodiment of the present invention. As shown in the embodiment of FIG. 3, processor 300 includes multiple domains. Specifically, a core domain 310 can include a plurality of cores 310*a*-310*n*, a graphics domain 320 can include one or more graphics engines, and a system agent domain 350 may further be present. In some embodiments, system agent domain 350 may execute at an independent frequency than the core domain and may remain powered on at all times to handle power control events and power management such that domains 310 and 320 can be controlled to dynamically enter into and exit high power and low power states. Each of domains 310 and 320 may operate at different voltage and/or power. Note that while only shown with three domains, understand the scope of the present invention is not limited in this regard and additional domains can be present in other embodiments. For example, multiple core domains may be present each including at least one core.

In general, each core 310 may further include low level caches in addition to various execution units and additional processing elements. In turn, the various cores may be coupled to each other and to a shared cache memory formed of a plurality of units of a last level cache (LLC) 340*a*-340*n*. In various embodiments, LLC 340 may be shared amongst the cores and the graphics engine, as well as various media processing circuitry. As seen, a ring interconnect 330 thus couples the cores together, and provides interconnection between the cores, graphics domain 320 and system agent circuitry 350. In one embodiment, interconnect 330 can be part of the core domain. However in other embodiments the ring interconnect can be of its own domain.

As further seen, system agent domain 350 may include display controller 352 which may provide control of and an interface to an associated display. As further seen, system agent domain 350 may include a power control unit 355 which can include logic to perform the power management techniques described herein.

As further seen in FIG. 3, processor 300 can further include an integrated memory controller (IMC) 370 that can provide for an interface to a system memory, such as a dynamic random access memory (DRAM). Multiple interfaces 380*a*-380*n* may be present to enable interconnection between the processor and other circuitry. For example, in one embodiment at least one direct media interface (DMI) interface may be provided as well as one or more PCIe™ interfaces. Still further, to provide for communications between other agents such as additional processors or other circuitry, one or more QPI interfaces may also be provided. Although shown at this high level in the embodiment of FIG. 3, understand the scope of the present invention is not limited in this regard.

Figure 4:
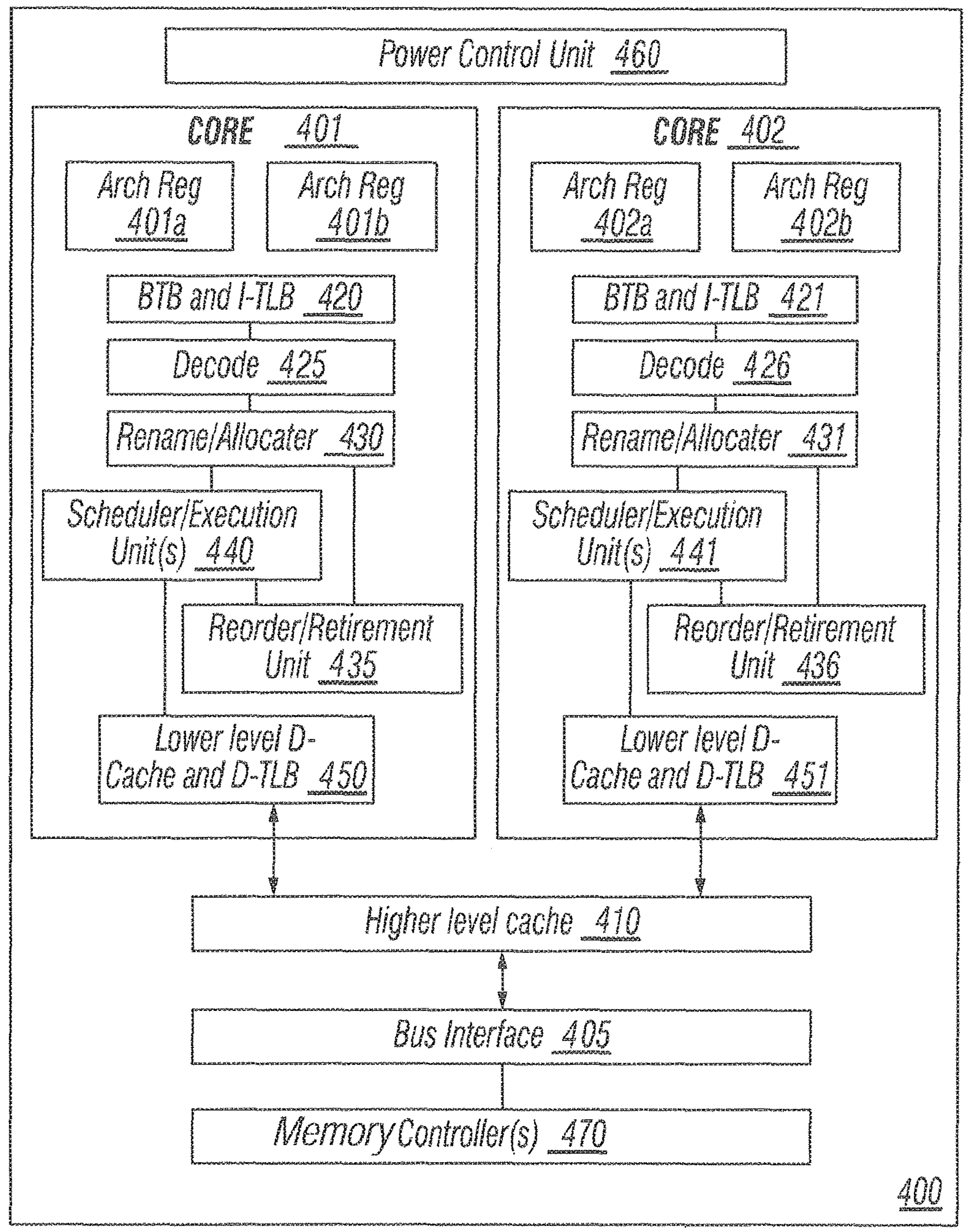
FIG. 4 is an embodiment of a processor including multiple cores.

Referring to FIG. 4, an embodiment of a processor including multiple cores is illustrated. Processor 400 includes any processor or processing device, such as a microprocessor, an embedded processor, a digital signal processor (DSP), a network processor, a handheld processor, an application processor, a co-processor, a system on a chip (SoC), or other device to execute code. Processor 400, in one embodiment, includes at least two cores—cores 401 and 402, which may include asymmetric cores or symmetric cores (the illustrated embodiment). However, processor 400 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 400, as illustrated in FIG. 4, includes two cores, cores 401 and 402. Here, cores 401 and 402 are considered symmetric cores, i.e., cores with the same configurations, functional units, and/or logic. In another embodiment, core 401 includes an out-of-order processor core, while core 402 includes an in-order processor core. However, cores 401 and 402 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 401 are described in further detail below, as the units in core 402 operate in a similar manner.

As depicted, core 401 includes two hardware threads 401*a* and 401*b*, which may also be referred to as hardware thread slots 401*a* and 401*b*. Therefore, software entities, such as an operating system, in one embodiment potentially view processor 400 as four separate processors, i.e., four logical processors or processing elements capable of executing four software threads concurrently. As alluded to above, a first thread is associated with architecture state registers 401*a*, a second thread is associated with architecture state registers 401*b*, a third thread may be associated with architecture state registers 402*a*, and a fourth thread may be associated with architecture state registers 402*b*. Here, each of the architecture state registers (401*a*, 401*b*, 402*a*, and 402*b*) may be referred to as processing elements, thread slots, or thread units, as described above. As illustrated, architecture state registers 401*a* are replicated in architecture state registers 401*b*, so individual architecture states/contexts are capable of being stored for logical processor 401*a* and logical processor 401*b*. In core 401, other smaller resources, such as instruction pointers and renaming logic in allocator and renamer block 430 may also be replicated for threads 401*a* and 401*b*. Some resources, such as re-order buffers in reorder/retirement unit 435, branch target buffer and instruction translation lookaside buffer (BTB and I-TLB) 420, load/store buffers, and queues may be shared through partitioning. Other resources, such as general purpose internal registers, page-table base register(s), low-level data-cache and data-TLB 450, execution unit(s) 440, and portions of out-of-order unit 435 are potentially fully shared.

Processor 400 often includes other resources, which may be fully shared, shared through partitioning, or dedicated by/to processing elements. In FIG. 4, an embodiment of a purely exemplary processor with illustrative logical units/resources of a processor is illustrated. Note that a processor may include, or omit, any of these functional units, as well as include any other known functional units, logic, or firmware not depicted. As illustrated, core 401 includes a simplified, representative out-of-order (OOO) processor core. But an in-order processor may be utilized in different embodiments. The OOO core includes a branch target buffer 420 to predict branches to be executed/taken and an instruction-translation buffer (I-TLB) 420 to store address translation entries for instructions.

Core 401 further includes decode module 425 coupled to a fetch unit to decode fetched elements. Fetch logic, in one embodiment, includes individual sequencers associated with thread slots 401*a*, 401*b*, respectively. Usually core 401 is associated with a first ISA, which defines/specifies instructions executable on processor 400. Often machine code instructions that are part of the first ISA include a portion of the instruction (referred to as an opcode), which references/specifies an instruction or operation to be performed. Decode logic 425 includes circuitry that recognizes these instructions from their opcodes and passes the decoded instructions on in the pipeline for processing as defined by the first ISA. For example, decoders 425, in one embodiment, include logic designed or adapted to recognize specific instructions, such as transactional instruction. As a result of the recognition by decoders 425, the architecture or core 401 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 430 includes an allocator to reserve resources, such as register files to store instruction processing results. However, threads 401*a* and 401*b* are potentially capable of out-of-order execution, where allocator and renamer block 430 also reserves other resources, such as reorder buffers to track instruction results. Unit 430 may also include a register renamer to rename program/instruction reference registers to other registers internal to processor 400. Reorder/retirement unit 435 includes components, such as the reorder buffers mentioned above, load buffers, and store buffers, to support out-of-order execution and later in-order retirement of instructions executed out-of-order.

Scheduler and execution unit(s) block 440, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation lookaside buffer (D-TLB) 450 are coupled to execution unit(s) 440.

The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 401 and 402 share access to higher-level or further-out cache 410, which is to cache recently fetched elements. Note that higher-level or further-out refers to cache levels increasing or getting further away from the execution unit(s). In one embodiment, higher-level cache 410 is a last-level data cache—last cache in the memory hierarchy on processor 400—such as a second or third level data cache. However, higher level cache 410 is not so limited, as it may be associated with or includes an instruction cache. A trace cache—a type of instruction cache—instead may be coupled after decoder 425 to store recently decoded traces.

In the depicted configuration, processor 400 also includes bus interface module 405 and a power control unit 460, which may perform power management in accordance with an embodiment of the present invention. In this scenario, bus interface 405 is to communicate with devices external to processor 400, such as system memory and other components.

A memory controller 470 may interface with other devices such as one or many memories. In an example, bus interface 405 includes a ring interconnect with a memory controller for interfacing with a memory and a graphics controller for interfacing with a graphics processor. In an SoC environment, even more devices, such as a network interface, coprocessors, memory, graphics processor, and any other known computer devices/interface may be integrated on a single die or integrated circuit to provide small form factor with high functionality and low power consumption.

Figure 5:
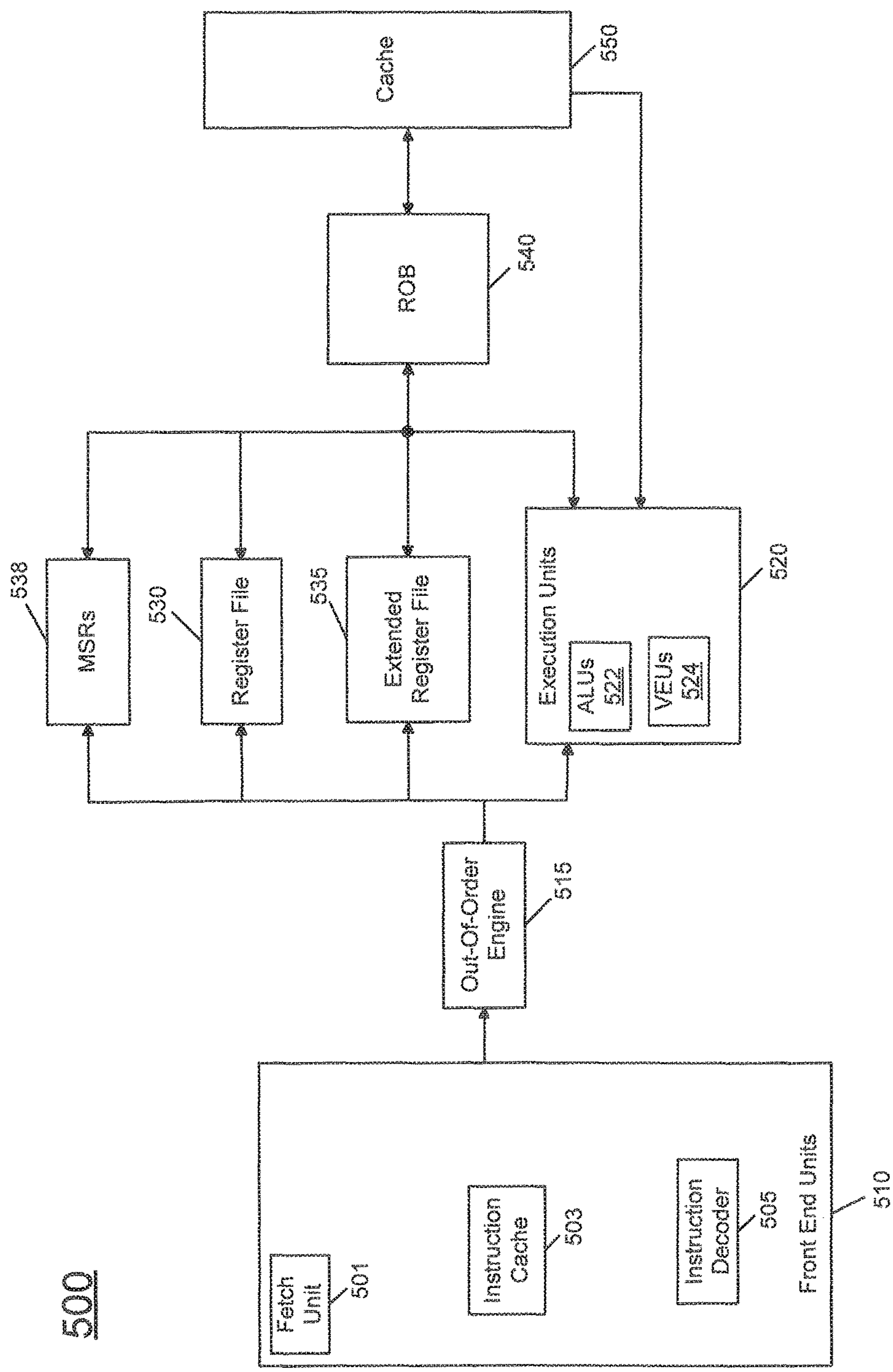
FIG. 5 is a block diagram of a micro-architecture of a processor core in accordance with one embodiment of the present invention.

Referring now to FIG. 5, shown is a block diagram of a micro-architecture of a processor core in accordance with one embodiment of the present invention. As shown in FIG. 5, processor core 500 may be a multi-stage pipelined out-of-order processor. Core 500 may operate at various voltages based on a received operating voltage, which may be received from an integrated voltage regulator or external voltage regulator.

As seen in FIG. 5, core 500 includes front end units 510, which may be used to fetch instructions to be executed and prepare them for use later in the processor pipeline. For example, front end units 510 may include a fetch unit 501, an instruction cache 503, and an instruction decoder 505. In some implementations, front end units 510 may further include a trace cache, along with microcode storage as well as a micro-operation storage. Fetch unit 501 may fetch macro-instructions, e.g., from memory or instruction cache 503, and feed them to instruction decoder 505 to decode them into primitives, i.e., micro-operations for execution by the processor.

Coupled between front end units 510 and execution units 520 is an out-of-order (OOO) engine 515 that may be used to receive the micro-instructions and prepare them for execution. More specifically OOO engine 515 may include various buffers to re-order micro-instruction flow and allocate various resources needed for execution, as well as to provide renaming of logical registers onto storage locations within various register files such as register file 530 and extended register file 535. Register file 530 may include separate register files for integer and floating point operations. For purposes of configuration, control, and additional operations, a set of machine specific registers (MSRs) 538 may also be present and accessible to various logic within core 500 (and external to the core).

Various resources may be present in execution units 520, including, for example, various integer, floating point, and single instruction multiple data (SIMD) logic units, among other specialized hardware. For example, such execution units may include one or more arithmetic logic units (ALUs) 522 and one or more vector execution units 524, among other such execution units.

Results from the execution units may be provided to retirement logic, namely a reorder buffer (ROB) 540. More specifically, ROB 540 may include various arrays and logic to receive information associated with instructions that are executed. This information is then examined by ROB 540 to determine whether the instructions can be validly retired and result data committed to the architectural state of the processor, or whether one or more exceptions occurred that prevent a proper retirement of the instructions. Of course, ROB 540 may handle other operations associated with retirement.

As shown in FIG. 5, ROB 540 is coupled to a cache 550 which, in one embodiment may be a low level cache (e.g., an L1 cache) although the scope of the present invention is not limited in this regard. Also, execution units 520 can be directly coupled to cache 550. From cache 550, data communication may occur with higher level caches, system memory and so forth. While shown with this high level in the embodiment of FIG. 5, understand the scope of the present invention is not limited in this regard. For example, while the implementation of FIG. 5 is with regard to an out-of-order machine such as of an Intel® x86 instruction set architecture (ISA), the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 6:
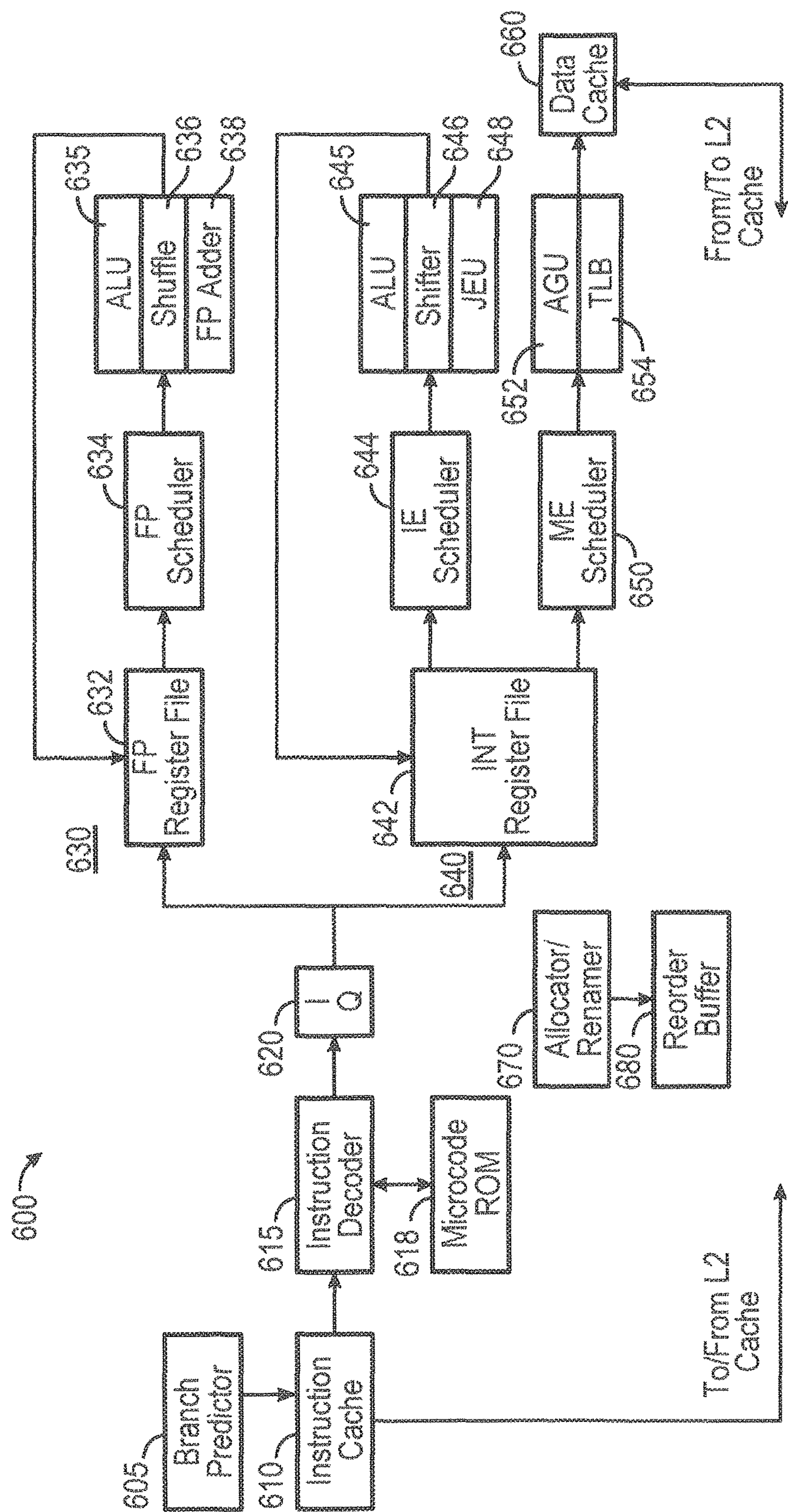
FIG. 6 is a block diagram of a micro-architecture of a processor core in accordance with another embodiment.

Referring now to FIG. 6, shown is a block diagram of a micro-architecture of a processor core in accordance with another embodiment. In the embodiment of FIG. 6, core 600 may be a low power core of a different micro-architecture, such as an Intel® Atom™-based processor having a relatively limited pipeline depth designed to reduce power consumption. As seen, core 600 includes an instruction cache 610 coupled to provide instructions to an instruction decoder 615. A branch predictor 605 may be coupled to instruction cache 610. Note that instruction cache 610 may further be coupled to another level of a cache memory, such as an L2 cache (not shown for ease of illustration in FIG. 6). In turn, instruction decoder 615 provides decoded instructions to an issue queue (IQ) 620 for storage and delivery to a given execution pipeline. A microcode ROM 618 is coupled to instruction decoder 615.

A floating point pipeline 630 includes a floating point (FP) register file 632 which may include a plurality of architectural registers of a given bit width such as 128, 256 or 512 bits. Pipeline 630 includes a floating point scheduler 634 to schedule instructions for execution on one of multiple execution units of the pipeline. In the embodiment shown, such execution units include an ALU 635, a shuffle unit 636, and a floating point adder 638. In turn, results generated in these execution units may be provided back to buffers and/or registers of register file 632. Of course understand while shown with these few example execution units, additional or different floating point execution units may be present in another embodiment.

An integer pipeline 640 also may be provided. In the embodiment shown, pipeline 640 includes an integer (INT) register file 642 which may include a plurality of architectural registers of a given bit width such as 128 or 256 bits. Pipeline 640 includes an integer execution (IE) scheduler 644 to schedule instructions for execution on one of multiple execution units of the pipeline. In the embodiment shown, such execution units include an ALU 645, a shifter unit 646, and a jump execution unit (JEU) 648. In turn, results generated in these execution units may be provided back to buffers and/or registers of register file 642. Of course understand while shown with these few example execution units, additional or different integer execution units may be present in another embodiment.

A memory execution (ME) scheduler 650 may schedule memory operations for execution in an address generation unit (AGU) 652, which is also coupled to a TLB 654. As seen, these structures may couple to a data cache 660, which may be a L0 and/or L1 data cache that in turn couples to additional levels of a cache memory hierarchy, including an L2 cache memory.

To provide support for out-of-order execution, an allocator/renamer 670 may be provided, in addition to a reorder buffer 680, which is configured to reorder instructions executed out of order for retirement in order. Although shown with this particular pipeline architecture in the illustration of FIG. 6, understand that many variations and alternatives are possible.

Note that in a processor having asymmetric cores, such as in accordance with the micro-architectures of FIGS. 5 and 6, workloads may be dynamically swapped between the cores for power management reasons, as these cores, although having different pipeline designs and depths, may be of the same or related ISA. Such dynamic core swapping may be performed in a manner transparent to a user application (and possibly kernel also).

Figure 7:
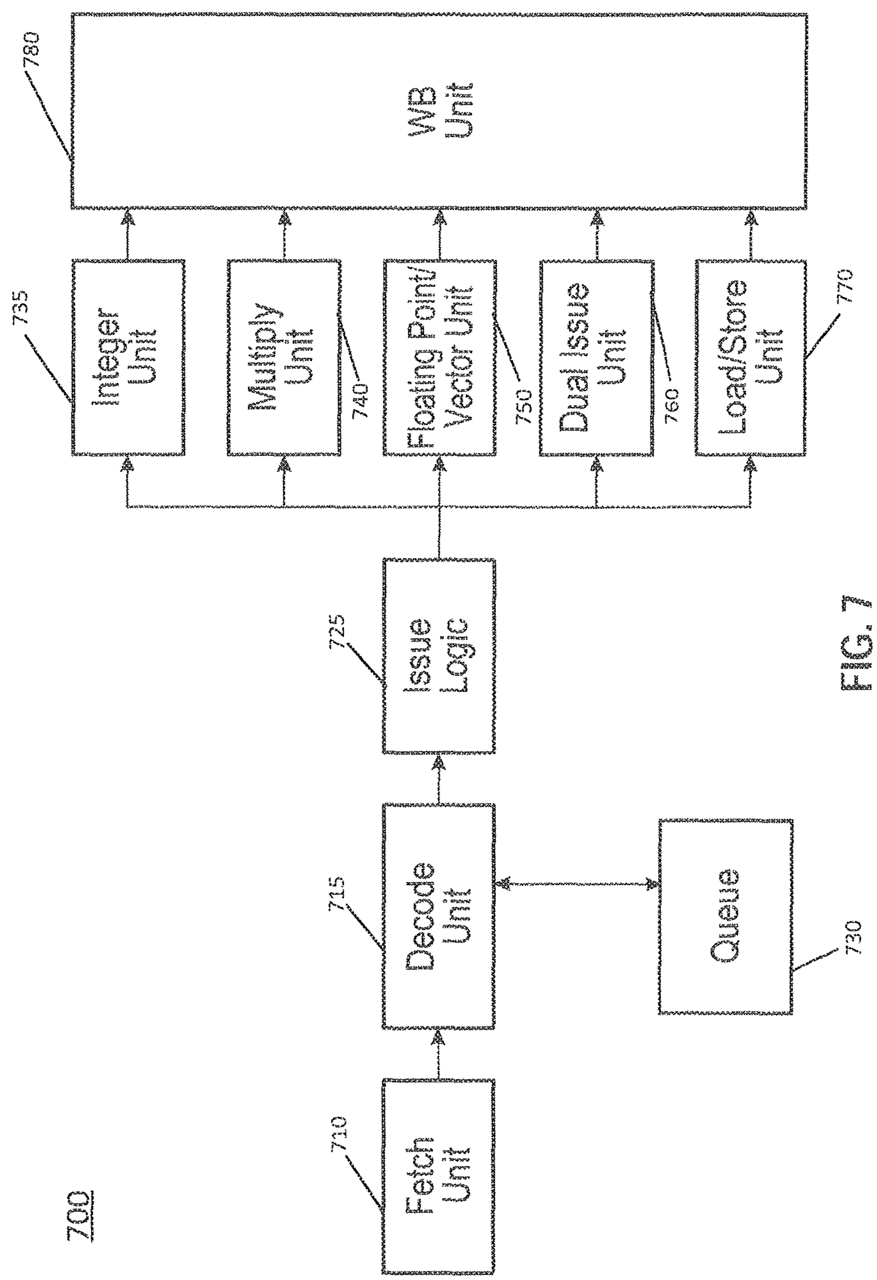
FIG. 7 is a block diagram of a micro-architecture of a processor core in accordance with yet another embodiment.

Referring to FIG. 7, shown is a block diagram of a micro-architecture of a processor core in accordance with yet another embodiment. As illustrated in FIG. 7, a core 700 may include a multi-staged in-order pipeline to execute at very low power consumption levels. As one such example, processor 700 may have a micro-architecture in accordance with an ARM Cortex A53 design available from ARM Holdings, LTD., Sunnyvale, Calif. In an implementation, an 8-stage pipeline may be provided that is configured to execute both 32-bit and 64-bit code. Core 700 includes a fetch unit 710 that is configured to fetch instructions and provide them to a decode unit 715, which may decode the instructions, e.g., macro-instructions of a given ISA such as an ARMv8 ISA. Note further that a queue 730 may couple to decode unit 715 to store decoded instructions. Decoded instructions are provided to an issue logic 725, where the decoded instructions may be issued to a given one of multiple execution units.

With further reference to FIG. 7, issue logic 725 may issue instructions to one of multiple execution units. In the embodiment shown, these execution units include an integer unit 735, a multiply unit 740, a floating point/vector unit 750, a dual issue unit 760, and a load/store unit 770. The results of these different execution units may be provided to a writeback (WB) unit 780. Understand that while a single writeback unit is shown for ease of illustration, in some implementations separate writeback units may be associated with each of the execution units. Furthermore, understand that while each of the units and logic shown in FIG. 7 is represented at a high level, a particular implementation may include more or different structures. A processor designed using one or more cores having a pipeline as in FIG. 7 may be implemented in many different end products, extending from mobile devices to server systems.

Figure 8:
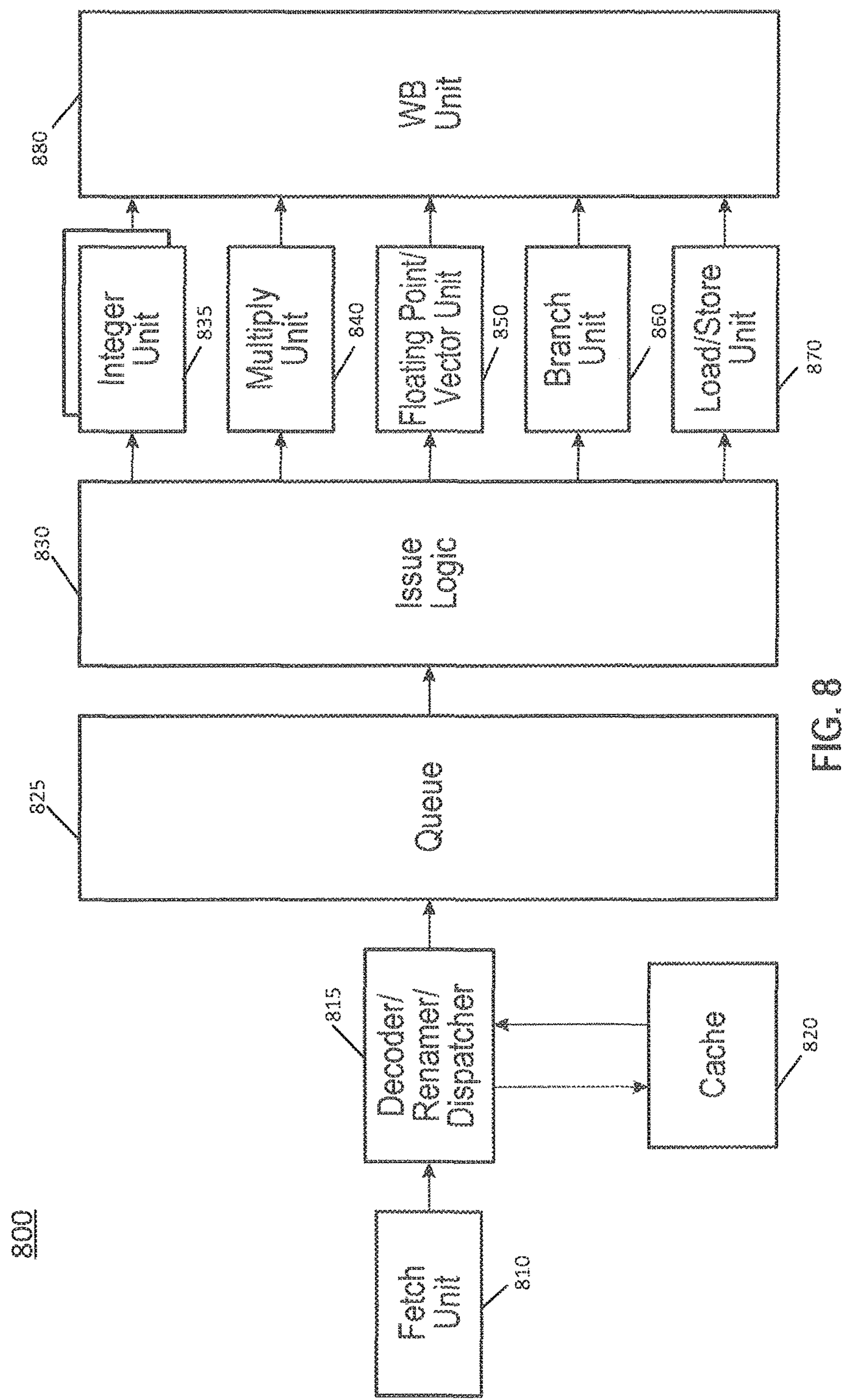
FIG. 8 is a block diagram of a micro-architecture of a processor core in accordance with a still further embodiment.

Referring to FIG. 8, shown is a block diagram of a micro-architecture of a processor core in accordance with a still further embodiment. As illustrated in FIG. 8, a core 800 may include a multi-stage multi-issue out-of-order pipeline to execute at very high performance levels (which may occur at higher power consumption levels than core 700 of FIG. 7). As one such example, processor 800 may have a microarchitecture in accordance with an ARM Cortex A57 design. In an implementation, a 15 (or greater)-stage pipeline may be provided that is configured to execute both 32-bit and 64-bit code. In addition, the pipeline may provide for 3 (or greater)-wide and 3 (or greater)-issue operation. Core 800 includes a fetch unit 810 that is configured to fetch instructions and provide them to a decoder/renamer/dispatcher unit 815 coupled to a cache 820. Unit 815 may decode the instructions, e.g., macro-instructions of an ARMv8 instruction set architecture, rename register references within the instructions, and dispatch the instructions (eventually) to a selected execution unit. Decoded instructions may be stored in a queue 825. Note that while a single queue structure is shown for ease of illustration in FIG. 8, understand that separate queues may be provided for each of the multiple different types of execution units.

Also shown in FIG. 8 is an issue logic 830 from which decoded instructions stored in queue 825 may be issued to a selected execution unit. Issue logic 830 also may be implemented in a particular embodiment with a separate issue logic for each of the multiple different types of execution units to which issue logic 830 couples.

Decoded instructions may be issued to a given one of multiple execution units. In the embodiment shown, these execution units include one or more integer units 835, a multiply unit 840, a floating point/vector unit 850, a branch unit 860, and a load/store unit 870. In an embodiment, floating point/vector unit 850 may be configured to handle SIMD or vector data of 128 or 256 bits. Still further, floating point/vector execution unit 850 may perform IEEE-754 double precision floating-point operations. The results of these different execution units may be provided to a writeback unit 880. Note that in some implementations separate writeback units may be associated with each of the execution units. Furthermore, understand that while each of the units and logic shown in FIG. 8 is represented at a high level, a particular implementation may include more or different structures.

Note that in a processor having asymmetric cores, such as in accordance with the micro-architectures of FIGS. 7 and 8, workloads may be dynamically swapped for power management reasons, as these cores, although having different pipeline designs and depths, may be of the same or related ISA. Such dynamic core swapping may be performed in a manner transparent to a user application (and possibly kernel also).

Figure 9:
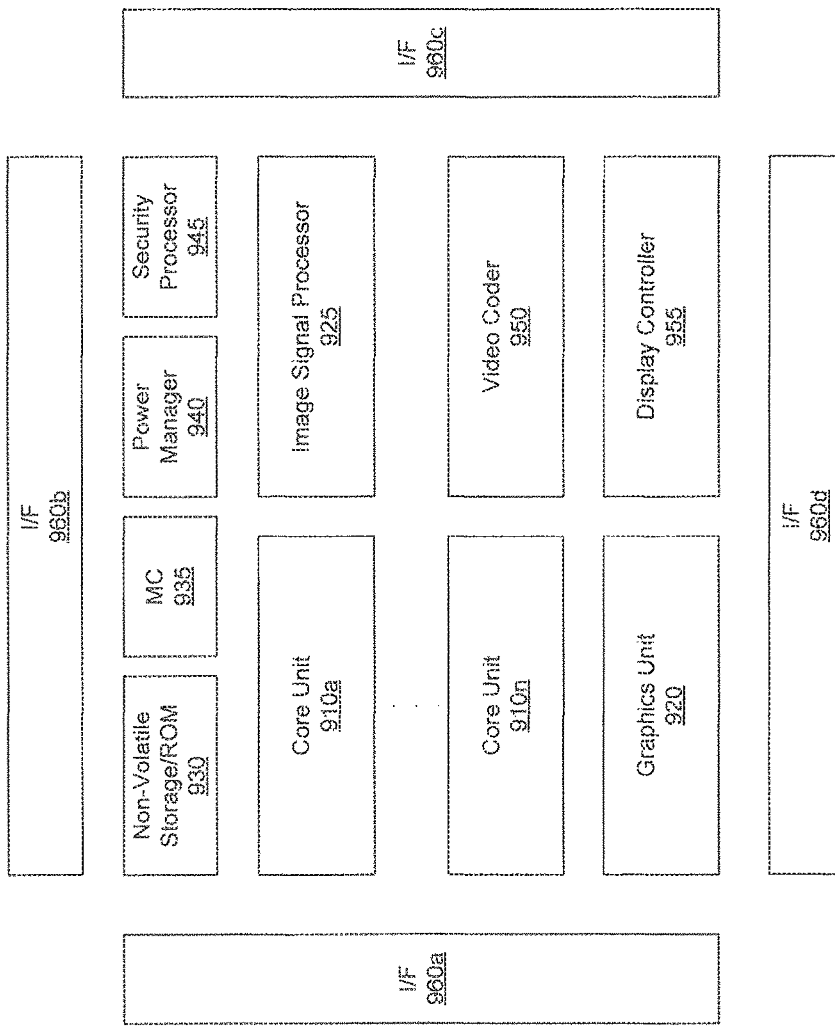
FIG. 9 is a block diagram of a processor in accordance with another embodiment of the present invention.

A processor designed using one or more cores having pipelines as in any one or more of FIGS. 5-8 may be implemented in many different end products, extending from mobile devices to server systems. Referring now to FIG. 9, shown is a block diagram of a processor in accordance with another embodiment of the present invention. In the embodiment of FIG. 9, processor 900 may be a SoC including multiple domains, each of which may be controlled to operate at an independent operating voltage and operating frequency. As a specific illustrative example, processor 900 may be an Intel® Architecture Core™-based processor such as an i3, i5, i7 or another such processor available from Intel Corporation. However, other low power processors such as available from Advanced Micro Devices, Inc. (AMD) of Sunnyvale, Calif., an ARM-based design from ARM Holdings, Ltd. or licensee thereof or a MIPS-based design from MIPS Technologies, Inc. of Sunnyvale, Calif., or their licensees or adopters may instead be present in other embodiments such as an Apple A7 processor, a Qualcomm Snapdragon processor, or Texas Instruments OMAP processor. Such SoC may be used in a low power system such as a smartphone, tablet computer, phablet computer, Ultrabook™ computer or other portable computing device, which may incorporate a heterogeneous system architecture having a heterogeneous system architecture-based processor design.

In the high level view shown in FIG. 9, processor 900 includes a plurality of core units 910*a*-910*n*. Each core unit may include one or more processor cores, one or more cache memories and other circuitry. Each core unit 910 may support one or more instruction sets (e.g., an x86 instruction set (with some extensions that have been added with newer versions); a MIPS instruction set; an ARM instruction set (with optional additional extensions such as NEON)) or other instruction set or combinations thereof. Note that some of the core units may be heterogeneous resources (e.g., of a different design). In addition, each such core may be coupled to a cache memory (not shown) which in an embodiment may be a shared level two (L2) cache memory. A non-volatile storage 930 may be used to store various program and other data. For example, this storage may be used to store at least portions of microcode, boot information such as a BIOS, other system software or so forth.

Each core unit 910 may also include an interface such as a bus interface unit to enable interconnection to additional circuitry of the processor. In an embodiment, each core unit 910 couples to a coherent fabric that may act as a primary cache coherent on-die interconnect that in turn couples to a memory controller 935. In turn, memory controller 935 controls communications with a memory such as a DRAM (not shown for ease of illustration in FIG. 9).

In addition to core units, additional processing engines are present within the processor, including at least one graphics unit 920 which may include one or more graphics processing units (GPUs) to perform graphics processing as well as to possibly execute general purpose operations on the graphics processor (so-called GPGPU operation). In addition, at least one image signal processor 925 may be present. Signal processor 925 may be configured to process incoming image data received from one or more capture devices, either internal to the SoC or off-chip.

Other accelerators also may be present. In the illustration of FIG. 9, a video coder 950 may perform coding operations including encoding and decoding for video information, e.g., providing hardware acceleration support for high definition video content. A display controller 955 further may be provided to accelerate display operations including providing support for internal and external displays of a system. In addition, a security processor 945 may be present to perform security operations such as secure boot operations, various cryptography operations and so forth.

Each of the units may have its power consumption controlled via a power manager 940, which may include control logic to perform the various power management techniques described herein.

In some embodiments, SoC 900 may further include a non-coherent fabric coupled to the coherent fabric to which various peripheral devices may couple. One or more interfaces 960*a*-960*d* enable communication with one or more off-chip devices. Such communications may be via a variety of communication protocols such as PCIe™, GPIO, USB, $I^2C$, UART, MIPI, SDIO, DDR, SPI, HDMI, among other types of communication protocols. Although shown at this high level in the embodiment of FIG. 9, understand the scope of the present invention is not limited in this regard.

Figure 10:
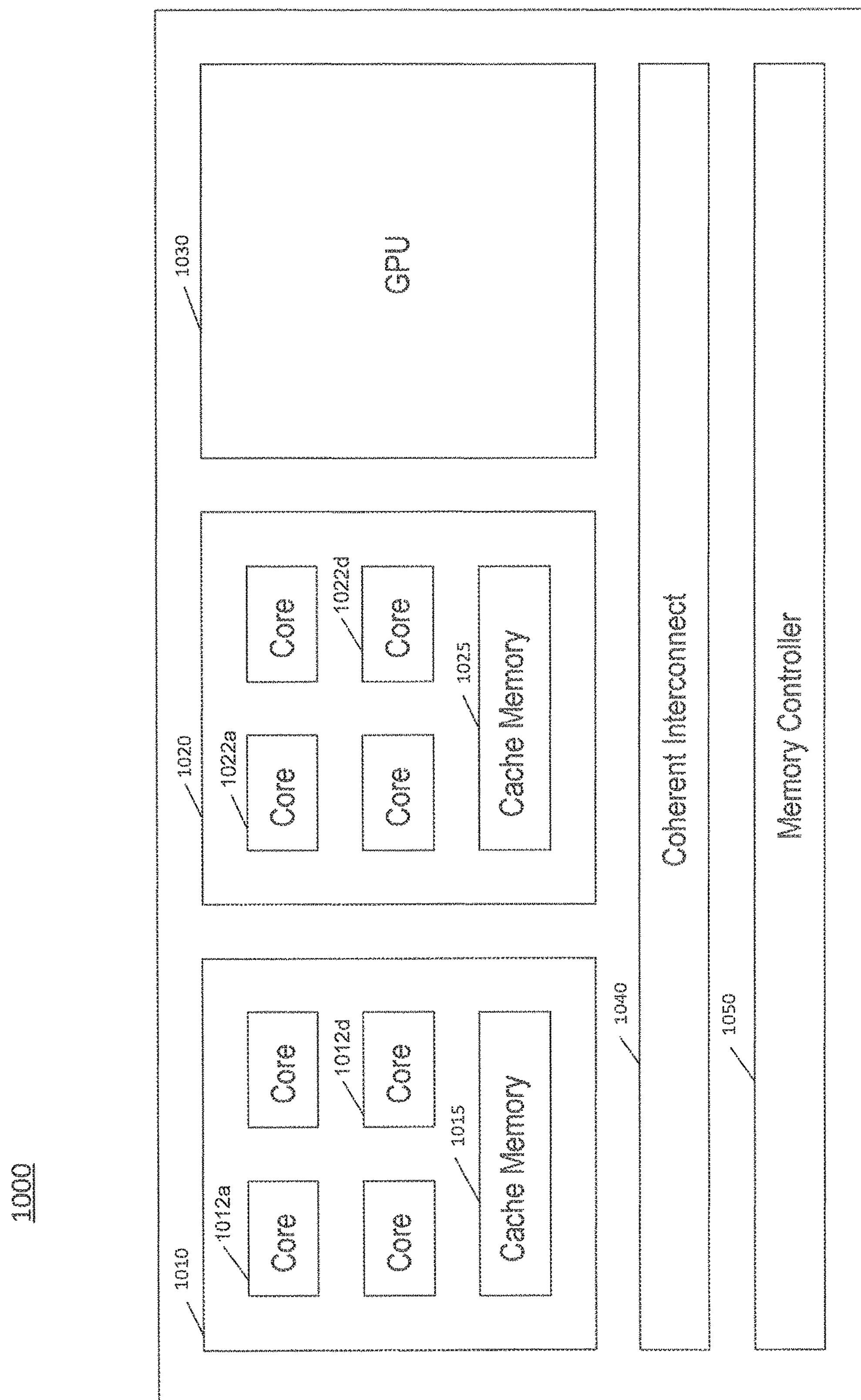
FIG. 10 is a block diagram of a representative SoC in accordance with an embodiment of the present invention.

Referring now to FIG. 10, shown is a block diagram of a representative SoC. In the embodiment shown, SoC 1000 may be a multi-core SoC configured for low power operation to be optimized for incorporation into a smartphone or other low power device such as a tablet computer or other portable computing device. As an example, SoC 1000 may be implemented using asymmetric or different types of cores, such as combinations of higher power and/or low power cores, e.g., out-of-order cores and in-order cores. In different embodiments, these cores may be based on an Intel® Architecture™ core design or an ARM architecture design. In yet other embodiments, a mix of Intel and ARM cores may be implemented in a given SoC.

As seen in FIG. 10, SoC 1000 includes a first core domain 1010 having a plurality of first cores 1012*a*-1012*d*. In an example, these cores may be low power cores such as in-order cores. In one embodiment these first cores may be implemented as ARM Cortex A53 cores. In turn, these cores couple to a cache memory 1015 of core domain 1010. In addition, SoC 1000 includes a second core domain 1020. In the illustration of FIG. 10, second core domain 1020 has a plurality of second cores 1022*a*-1022*d*. In an example, these cores may be higher power-consuming cores than first cores 1012. In an embodiment, the second cores may be out-of-order cores, which may be implemented as ARM Cortex A57 cores. In turn, these cores couple to a cache memory 1025 of core domain 1020. Note that while the example shown in FIG. 10 includes 4 cores in each domain, understand that more or fewer cores may be present in a given domain in other examples.

With further reference to FIG. 10, a graphics domain 1030 also is provided, which may include one or more graphics processing units (GPUs) configured to independently execute graphics workloads, e.g., provided by one or more cores of core domains 1010 and 1020. As an example, GPU domain 1030 may be used to provide display support for a variety of screen sizes, in addition to providing graphics and display rendering operations.

As seen, the various domains couple to a coherent interconnect 1040, which in an embodiment may be a cache coherent interconnect fabric that in turn couples to an integrated memory controller 1050. Coherent interconnect 1040 may include a shared cache memory, such as an L3 cache, in some examples. In an embodiment, memory controller 1050 may be a direct memory controller to provide for multiple channels of communication with an off-chip memory, such as multiple channels of a DRAM (not shown for ease of illustration in FIG. 10).

In different examples, the number of the core domains may vary. For example, for a low power SoC suitable for incorporation into a mobile computing device, a limited number of core domains such as shown in FIG. 10 may be present. Still further, in such low power SoCs, core domain 1020 including higher power cores may have fewer numbers of such cores. For example, in one implementation two cores 1022 may be provided to enable operation at reduced power consumption levels. In addition, the different core domains may also be coupled to an interrupt controller to enable dynamic swapping of workloads between the different domains.

In yet other embodiments, a greater number of core domains, as well as additional optional IP logic may be present, in that an SoC can be scaled to higher performance (and power) levels for incorporation into other computing devices, such as desktops, servers, high performance computing systems, base stations forth. As one such example, 4 core domains each having a given number of out-of-order cores may be provided. Still further, in addition to optional GPU support (which as an example may take the form of a GPGPU), one or more accelerators to provide optimized hardware support for particular functions (e.g. web serving, network processing, switching or so forth) also may be provided. In addition, an input/output interface may be present to couple such accelerators to off-chip components.

Figure 11:
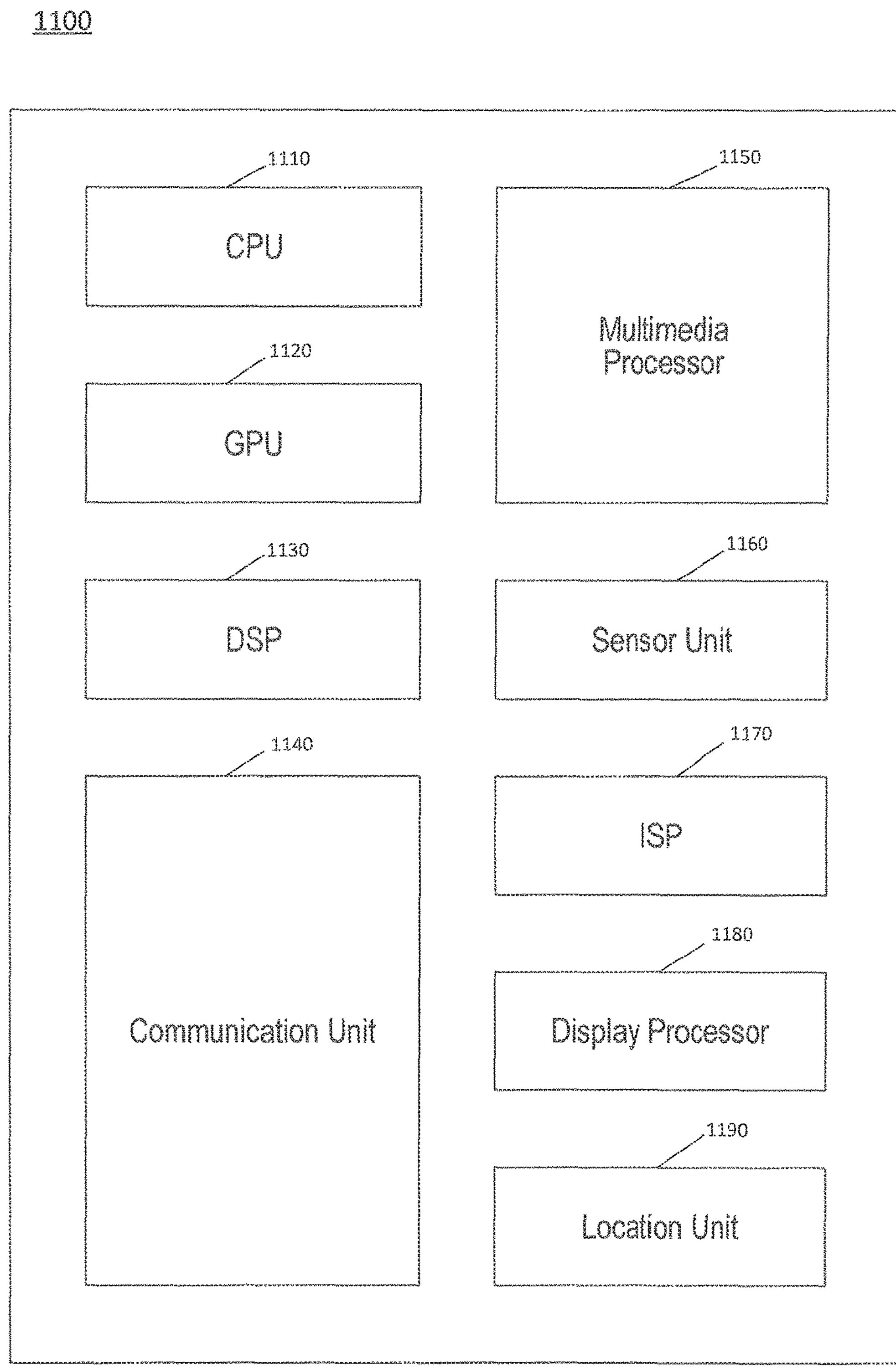
FIG. 11 is a block diagram of another example SoC in accordance with an embodiment of the present invention.

Referring now to FIG. 11, shown is a block diagram of another example SoC. In the embodiment of FIG. 11, SoC 1100 may include various circuitry to enable high performance for multimedia applications, communications and other functions. As such, SoC 1100 is suitable for incorporation into a wide variety of portable and other devices, such as smartphones, tablet computers, smart TVs and so forth. In the example shown, SoC 1100 includes a central processor unit (CPU) domain 1110. In an embodiment, a plurality of individual processor cores may be present in CPU domain 1110. As one example, CPU domain 1110 may be a quad core processor having 4 multithreaded cores. Such processors may be homogeneous or heterogeneous processors, e.g., a mix of low power and high power processor cores.

In turn, a GPU domain 1120 is provided to perform advanced graphics processing in one or more GPUs to handle graphics and compute APIs. A DSP unit 1130 may provide one or more low power DSPs for handling low-power multimedia applications such as music playback, audio/video and so forth, in addition to advanced calculations that may occur during execution of multimedia instructions. In turn, a communication unit 1140 may include various components to provide connectivity via various wireless protocols, such as cellular communications (including 3G/4G LTE), wireless local area protocols such as Bluetooth™, IEEE 802.11, and so forth.

Still further, a multimedia processor 1150 may be used to perform capture and playback of high definition video and audio content, including processing of user gestures. A sensor unit 1160 may include a plurality of sensors and/or a sensor controller to interface to various off-chip sensors present in a given platform. An image signal processor 1170 may be provided with one or more separate ISPs to perform image processing with regard to captured content from one or more cameras of a platform, including still and video cameras.

A display processor 1180 may provide support for connection to a high definition display of a given pixel density, including the ability to wirelessly communicate content for playback on such display. Still further, a location unit 1190 may include a GPS receiver with support for multiple GPS constellations to provide applications highly accurate positioning information obtained using as such GPS receiver. Understand that while shown with this particular set of components in the example of FIG. 11, many variations and alternatives are possible.

Figure 12:
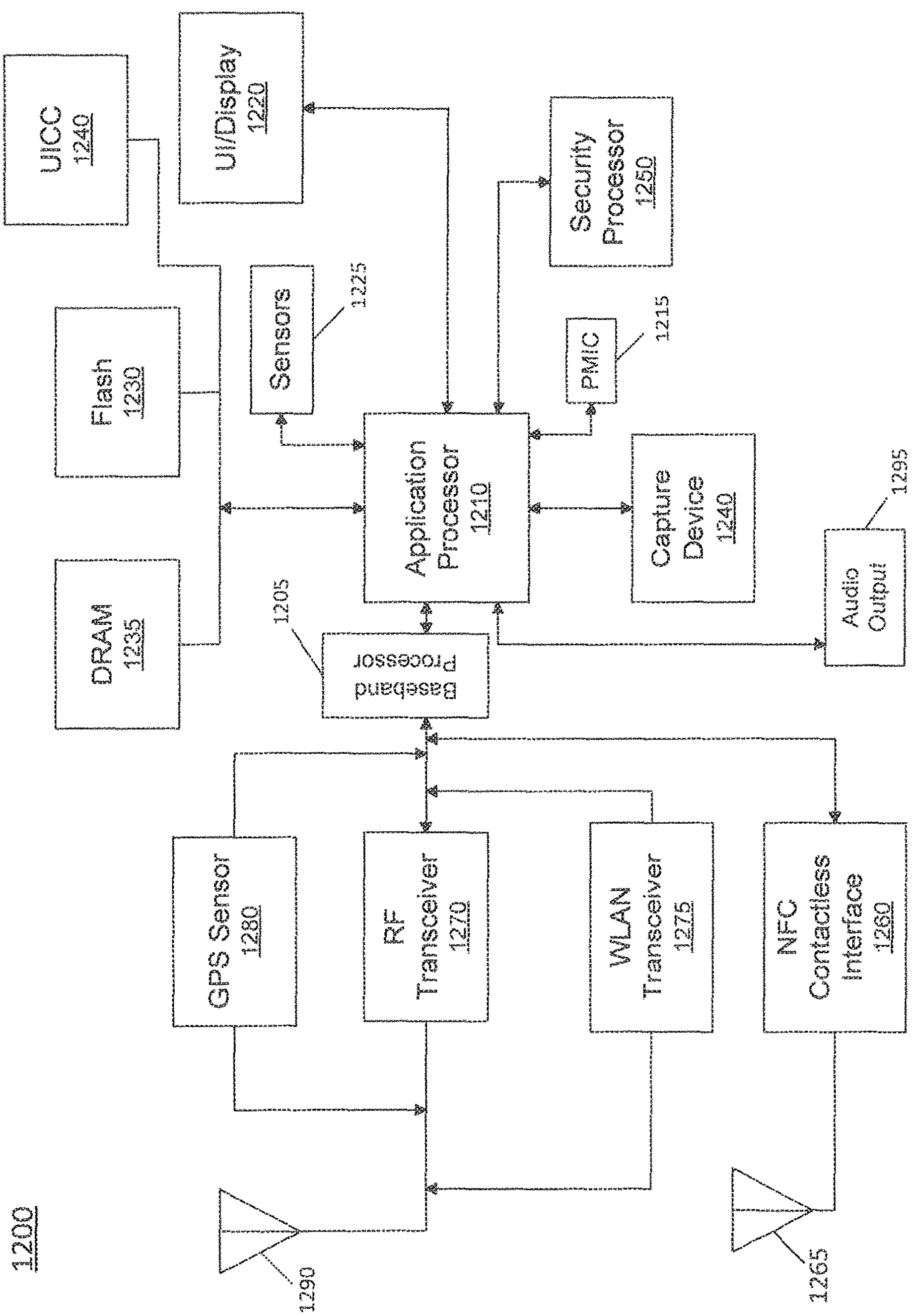
FIG. 12 is a block diagram of an example system with which embodiments can be used.

Referring now to FIG. 12, shown is a block diagram of an example system with which embodiments can be used. As seen, system 1200 may be a smartphone or other wireless communicator. A baseband processor 1205 is configured to perform various signal processing with regard to communication signals to be transmitted from or received by the system. In turn, baseband processor 1205 is coupled to an application processor 1210, which may be a main CPU of the system to execute an OS and other system software, in addition to user applications such as many well-known social media and multimedia apps. Application processor 1210 may further be configured to perform a variety of other computing operations for the device.

In turn, application processor 1210 can couple to a user interface/display 1220, e.g., a touch screen display. In addition, application processor 1210 may couple to a memory system including a non-volatile memory, namely a flash memory 1230 and a system memory, namely a dynamic random access memory (DRAM) 1235. As further seen, application processor 1210 further couples to a capture device 1240 such as one or more image capture devices that can record video and/or still images.

Still referring to FIG. 12, a universal integrated circuit card (UICC) 1240 comprising a subscriber identity module and possibly a secure storage and cryptoprocessor is also coupled to application processor 1210. System 1200 may further include a security processor 1250 that may couple to application processor 1210. A plurality of sensors 1225 may couple to application processor 1210 to enable input of a variety of sensed information such as accelerometer and other environmental information. An audio output device 1295 may provide an interface to output sound, e.g., in the form of voice communications, played or streaming audio data and so forth.

As further illustrated, a near field communication (NFC) contactless interface 1260 is provided that communicates in a NFC near field via an NFC antenna 1265. While separate antennae are shown in FIG. 12, understand that in some implementations one antenna or a different set of antennae may be provided to enable various wireless functionality.

A power management integrated circuit (PMIC) 1215 couples to application processor 1210 to perform platform level power management. To this end, PMIC 1215 may issue power management requests to application processor 1210 to enter certain low power states as desired. Furthermore, based on platform constraints, PMIC 1215 may also control the power level of other components of system 1200.

To enable communications to be transmitted and received, various circuitry may be coupled between baseband processor 1205 and an antenna 1290. Specifically, a radio frequency (RF) transceiver 1270 and a wireless local area network (WLAN) transceiver 1275 may be present. In general, RF transceiver 1270 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 1280 may be present. Other wireless communications such as receipt or transmission of radio signals, e.g., AM/FM and other signals may also be provided. In addition, via WLAN transceiver 1275, local wireless communications can also be realized.

Figure 13:
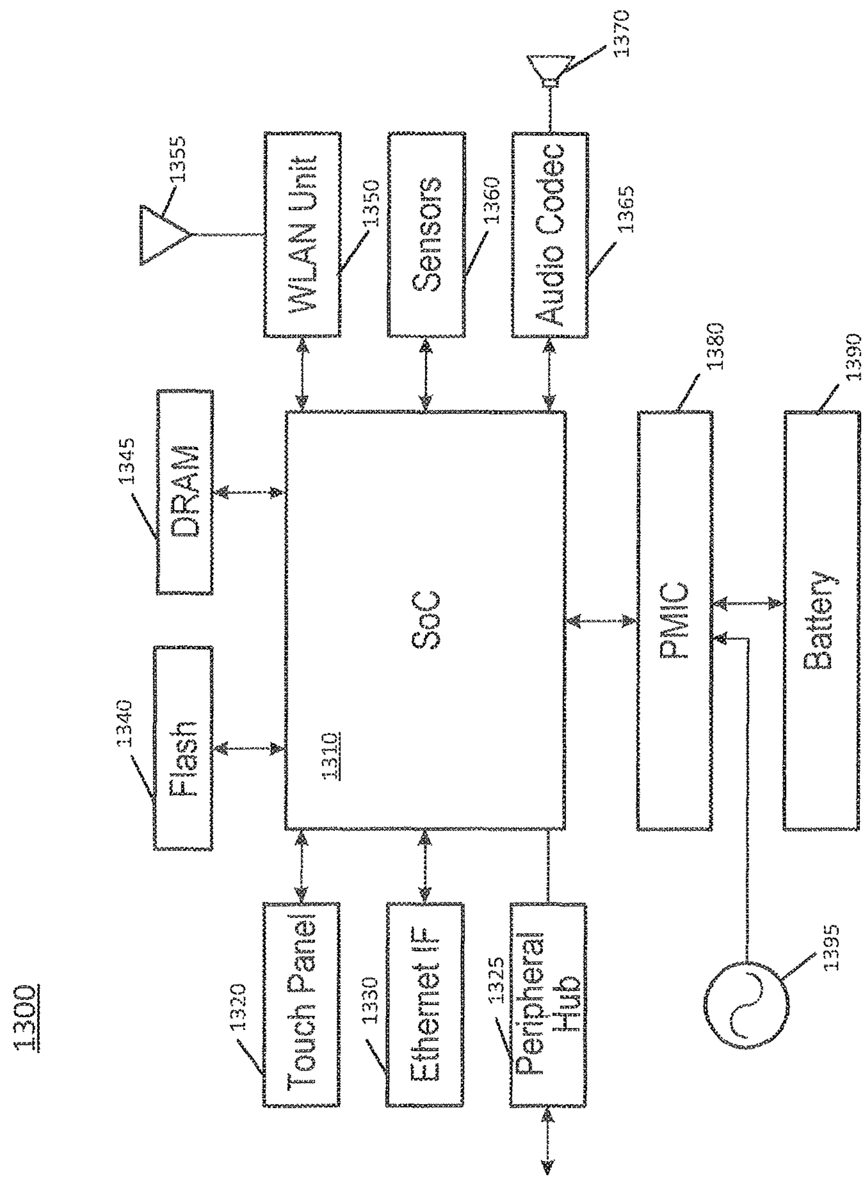
FIG. 13 is a block diagram of another example system with which embodiments may be used.

Referring now to FIG. 13, shown is a block diagram of another example system with which embodiments may be used. In the illustration of FIG. 13, system 1300 may be mobile low-power system such as a tablet computer, 2:1 tablet, phablet or other convertible or standalone tablet system. As illustrated, a SoC 1310 is present and may be configured to operate as an application processor for the device.

A variety of devices may couple to SoC 1310. In the illustration shown, a memory subsystem includes a flash memory 1340 and a DRAM 1345 coupled to SoC 1310. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310.

Still referring to FIG. 13, to provide for wireless capabilities, a WLAN unit 1350 is coupled to SoC 1310 and in turn to an antenna 1355. In various implementations, WLAN unit 1350 may provide for communication according to one or more wireless protocols.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 13, many variations and alternatives are possible.

Figure 14:
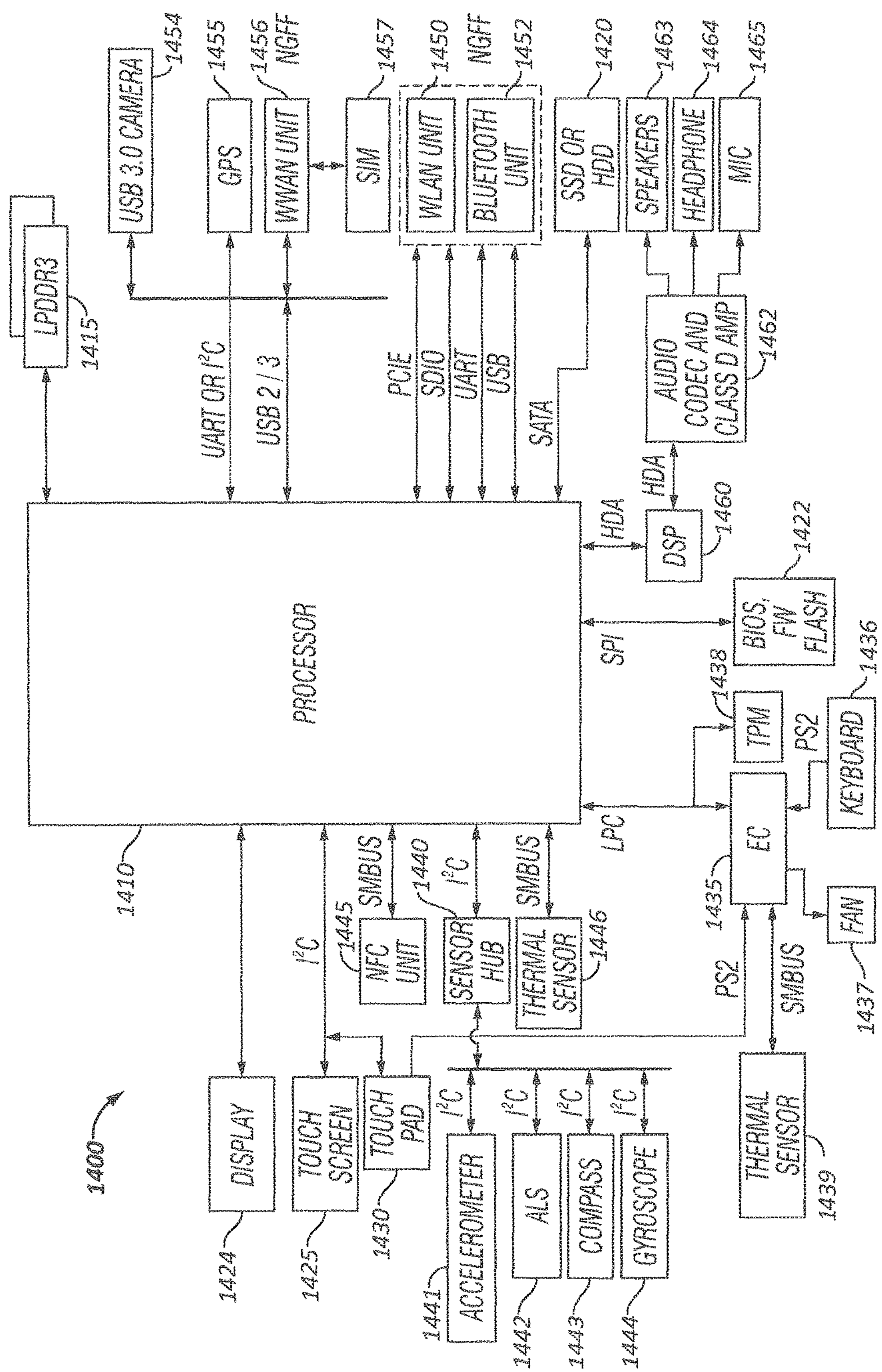
FIG. 14 is a block diagram of a representative computer system.

Referring now to FIG. 14, shown is a block diagram of a representative computer system such as notebook, Ultrabook™ or other small form factor system. A processor 1410, in one embodiment, includes a microprocessor, multi-core processor, multithreaded processor, an ultra low voltage processor, an embedded processor, or other known processing element. In the illustrated implementation, processor 1410 acts as a main processing unit and central hub for communication with many of the various components of the system 1400, and may include power management circuitry as described herein. As one example, processor 1410 is implemented as a SoC. In an embodiment, processor 1410 may include a power control unit as described herein, along with configuration registers or other MSRs to store performance state hint settings received from package-level sources and thread-level sources. Depending upon the controls indicated, the power control unit may determine a performance state for one or more cores based on a combination of these settings, or based on the settings from a single source only.

Processor 1410, in one embodiment, communicates with a system memory 1415. As an illustrative example, the system memory 1415 is implemented via multiple memory devices or modules to provide for a given amount of system memory.

To provide for persistent storage of information such as data, applications, one or more operating systems and so forth, a mass storage 1420 may also couple to processor 1410. In various embodiments, to enable a thinner and lighter system design as well as to improve system responsiveness, this mass storage may be implemented via a SSD or the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 14, a flash device 1422 may be coupled to processor 1410, e.g., via a serial peripheral interface (SPI). This flash device may provide for non-volatile storage of system software, including a basic input/output software (BIOS) as well as other firmware of the system.

Various input/output (I/O) devices may be present within system 1400. Specifically shown in the embodiment of FIG. 14 is a display 1424 which may be a high definition LCD or LED panel that further provides for a touch screen 1425. In one embodiment, display 1424 may be coupled to processor 1410 via a display interconnect that can be implemented as a high performance graphics interconnect. Touch screen 1425 may be coupled to processor 1410 via another interconnect, which in an embodiment can be an $I^2C$ interconnect. As further shown in FIG. 14, in addition to touch screen 1425, user input by way of touch can also occur via a touch pad 1430 which may be configured within the chassis and may also be coupled to the same $I^2C$ interconnect as touch screen 1425.

For perceptual computing and other purposes, various sensors may be present within the system and may be coupled to processor 1410 in different manners. Certain inertial and environmental sensors may couple to processor 1410 through a sensor hub 1440, e.g., via an $I^2C$ interconnect. In the embodiment shown in FIG. 14, these sensors may include an accelerometer 1441, an ambient light sensor (ALS) 1442, a compass 1443 and a gyroscope 1444. Other environmental sensors may include one or more thermal sensors 1446 which in some embodiments couple to processor 1410 via a system management bus (SMBus) bus.

Also seen in FIG. 14, various peripheral devices may couple to processor 1410 via a low pin count (LPC) interconnect. In the embodiment shown, various components can be coupled through an embedded controller 1435. Such components can include a keyboard 1436 (e.g., coupled via a PS2 interface), a fan 1437, and a thermal sensor 1439. In some embodiments, touch pad 1430 may also couple to EC 1435 via a PS2 interface. In addition, a security processor such as a trusted platform module (TPM) 1438 may also couple to processor 1410 via this LPC interconnect.

System 1400 can communicate with external devices in a variety of manners, including wirelessly. In the embodiment shown in FIG. 14, various wireless modules, each of which can correspond to a radio configured for a particular wireless communication protocol, are present. One manner for wireless communication in a short range such as a near field may be via a NFC unit 1445 which may communicate, in one embodiment with processor 1410 via an SMBus. Note that via this NFC unit 1445, devices in close proximity to each other can communicate.

As further seen in FIG. 14, additional wireless units can include other short range wireless engines including a WLAN unit 1450 and a Bluetooth™ unit 1452. Using WLAN unit 1450, Wi-Fi™ communications can be realized, while via Bluetooth™ unit 1452, short range Bluetooth™ communications can occur. These units may communicate with processor 1410 via a given link.

In addition, wireless wide area communications, e.g., according to a cellular or other wireless wide area protocol, can occur via a WWAN unit 1456 which in turn may couple to a subscriber identity module (SIM) 1457. In addition, to enable receipt and use of location information, a GPS module 1455 may also be present. Note that in the embodiment shown in FIG. 14, WWAN unit 1456 and an integrated capture device such as a camera module 1454 may communicate via a given link.

To provide for audio inputs and outputs, an audio processor can be implemented via a digital signal processor (DSP) 1460, which may couple to processor 1410 via a high definition audio (HDA) link. Similarly, DSP 1460 may communicate with an integrated coder/decoder (CODEC) and amplifier 1462 that in turn may couple to output speakers 1463 which may be implemented within the chassis. Similarly, amplifier and CODEC 1462 can be coupled to receive audio inputs from a microphone 1465 which in an embodiment can be implemented via dual array microphones (such as a digital microphone array) to provide for high quality audio inputs to enable voice-activated control of various operations within the system. Note also that audio outputs can be provided from amplifier/CODEC 1462 to a headphone jack 1464. Although shown with these particular components in the embodiment of FIG. 14, understand the scope of the present invention is not limited in this regard.

Figure 15:
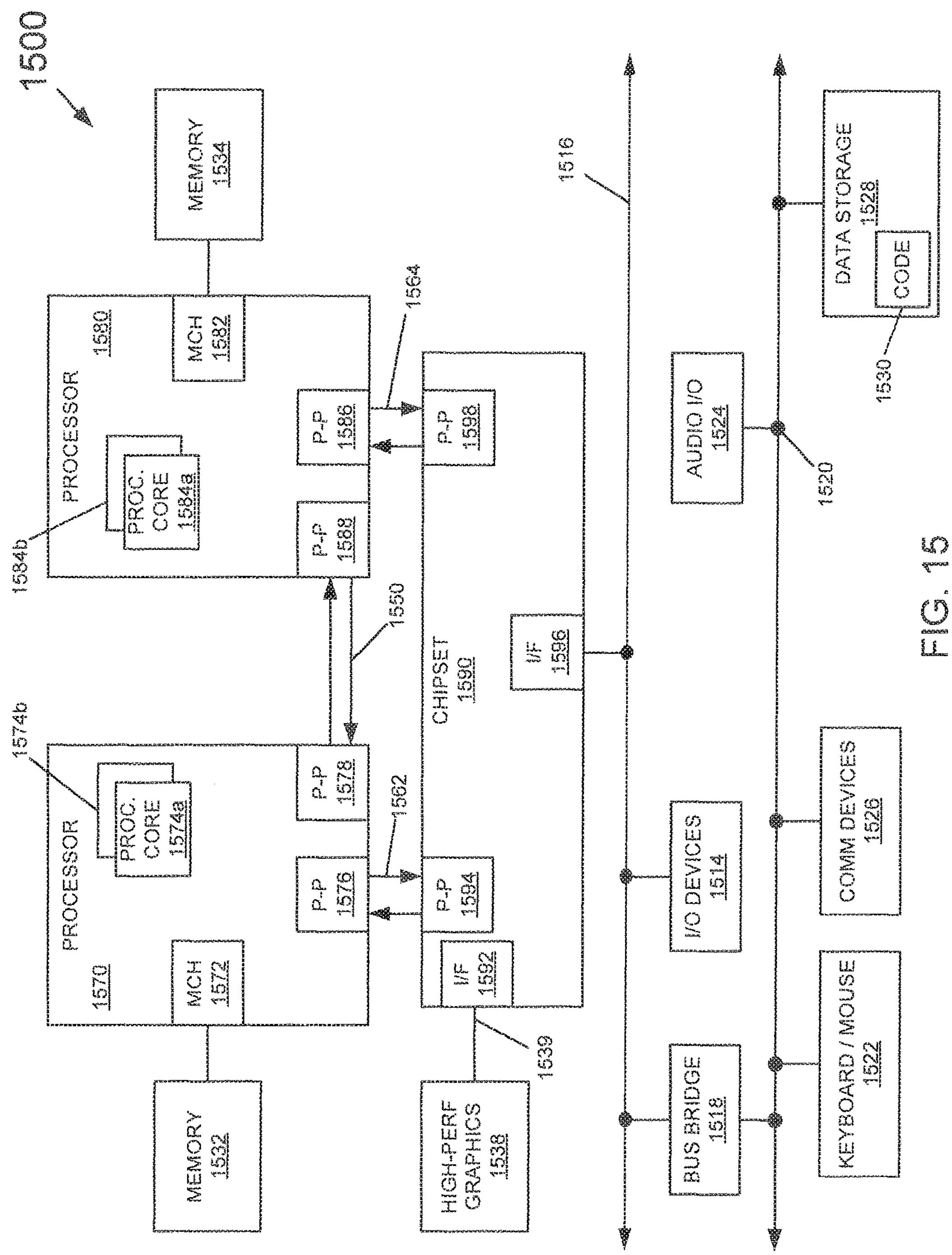
FIG. 15 is a block diagram of a system in accordance with an embodiment of the present invention.

Embodiments may be implemented in many different system types. Referring now to FIG. 15, shown is a block diagram of a system in accordance with an embodiment of the present invention. As shown in FIG. 15, multiprocessor system 1500 is a point-to-point interconnect system, and includes a first processor 1570 and a second processor 1580 coupled via a point-to-point interconnect 1550. As shown in FIG. 15, each of processors 1570 and 1580 may be multicore processors, including first and second processor cores (i.e., processor cores 1574*a* and 1574*b* and processor cores 1584*a* and 1584*b*), although potentially many more cores may be present in the processors. Each of the processors can include a PCU or other power management logic to perform processor-based power management as described herein, including the performance state determinations made using combinations of package-level and thread-level performance state hint settings, e.g., obtained as part of OS and thread state or provided by way of configuration registers.

Still referring to FIG. 15, first processor 1570 further includes a memory controller hub (MCH) 1572 and point-to-point (P-P) interfaces 1576 and 1578. Similarly, second processor 1580 includes a MCH 1582 and P-P interfaces 1586 and 1588. As shown in FIG. 15, MCH's 1572 and 1582 couple the processors to respective memories, namely a memory 1532 and a memory 1534, which may be portions of system memory (e.g., DRAM) locally attached to the respective processors. First processor 1570 and second processor 1580 may be coupled to a chipset 1590 via P-P interconnects 1562 and 1564, respectively. As shown in FIG. 15, chipset 1590 includes P-P interfaces 1594 and 1598.

Furthermore, chipset 1590 includes an interface 1592 to couple chipset 1590 with a high performance graphics engine 1538, by a P-P interconnect 1539. In turn, chipset 1590 may be coupled to a first bus 1516 via an interface 1596. As shown in FIG. 15, various input/output (I/O) devices 1514 may be coupled to first bus 1516, along with a bus bridge 1518 which couples first bus 1516 to a second bus 1520. Various devices may be coupled to second bus 1520 including, for example, a keyboard/mouse 1522, communication devices 1526 and a data storage unit 1528 such as a disk drive or other mass storage device which may include code 1530, in one embodiment. Further, an audio I/O 1524 may be coupled to second bus 1520. Embodiments can be incorporated into other types of systems including mobile devices such as a smart cellular telephone, tablet computer, netbook, Ultrabook™, or so forth.

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 16:
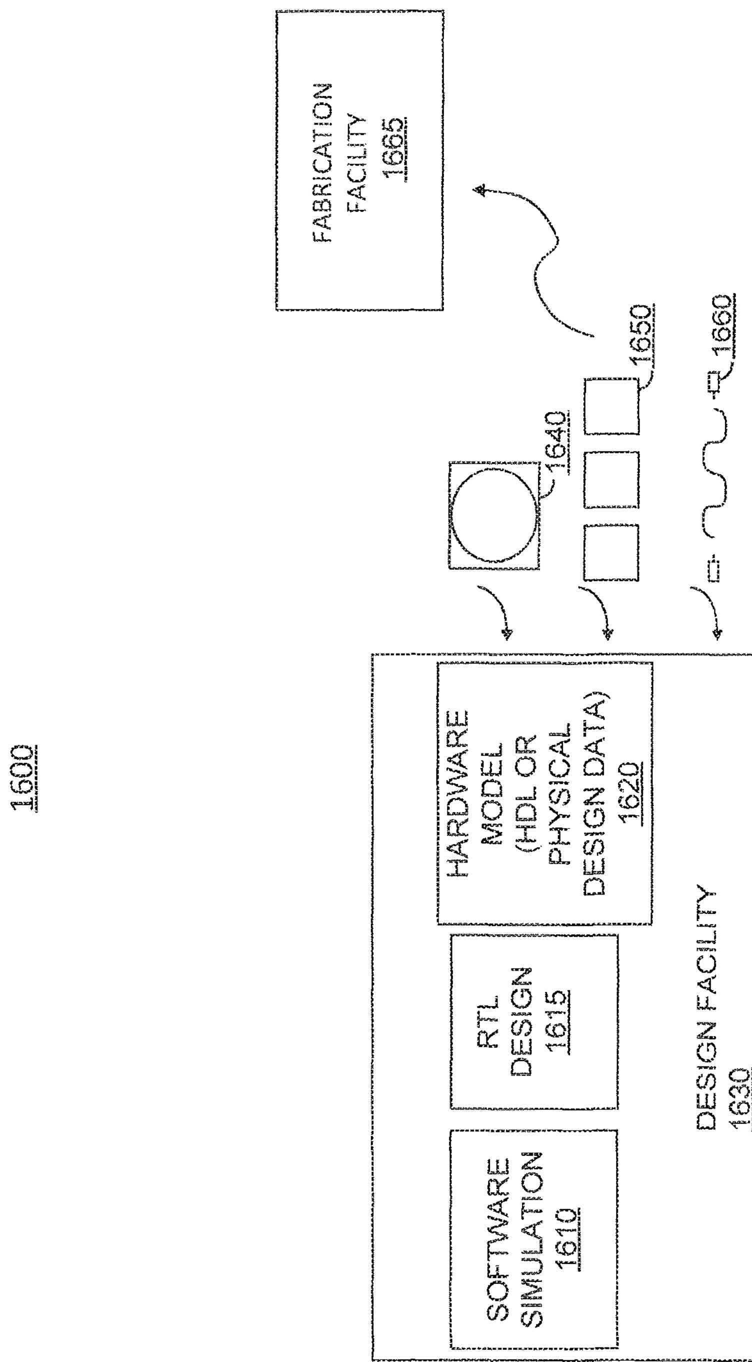
FIG. 16 is a block diagram illustrating an IP core development system used to manufacture an integrated circuit to perform operations according to an embodiment.

FIG. 16 is a block diagram illustrating an IP core development system 1600 that may be used to manufacture an integrated circuit to perform operations according to an embodiment. The IP core development system 1600 may be used to generate modular, reusable designs that can be incorporated into a larger design or used to construct an entire integrated circuit (e.g., an SoC integrated circuit). A design facility 1630 can generate a software simulation 1610 of an IP core design in a high level programming language (e.g., C/C++). The software simulation 1610 can be used to design, test, and verify the behavior of the IP core. A register transfer level (RTL) design can then be created or synthesized from the simulation model. The RTL design 1615 is an abstraction of the behavior of the integrated circuit that models the flow of digital signals between hardware registers, including the associated logic performed using the modeled digital signals. In addition to an RTL design 1615, lower-level designs at the logic level or transistor level may also be created, designed, or synthesized. Thus, the particular details of the initial design and simulation may vary.

The RTL design 1615 or equivalent may be further synthesized by the design facility into a hardware model 1620, which may be in a hardware description language (HDL), or some other representation of physical design data. The HDL may be further simulated or tested to verify the IP core design. The IP core design can be stored for delivery to a third party fabrication facility 1665 using non-volatile memory 1640 (e.g., hard disk, flash memory, or any non-volatile storage medium). Alternately, the IP core design may be transmitted (e.g., via the Internet) over a wired connection 1650 or wireless connection 1660. The fabrication facility 1665 may then fabricate an integrated circuit that is based at least in part on the IP core design. The fabricated integrated circuit can be configured to perform operations in accordance with at least one embodiment described herein.

A power controller as described herein can autonomously select performance states while utilizing OS and/or thread-supplied performance guidance hints, referred to as hardware-controlled performance states (HWP). When HWP is active, processor hardware such as a power controller may autonomously select performance states as deemed appropriate for the applied workload and with consideration of constraining hints that are programmed by OS and/or executing threads as described herein. These hints include minimum and maximum performance limits, preference towards energy efficiency or performance, and the specification of a relevant workload history observation time window, as examples in an embodiment.

Figure 17:
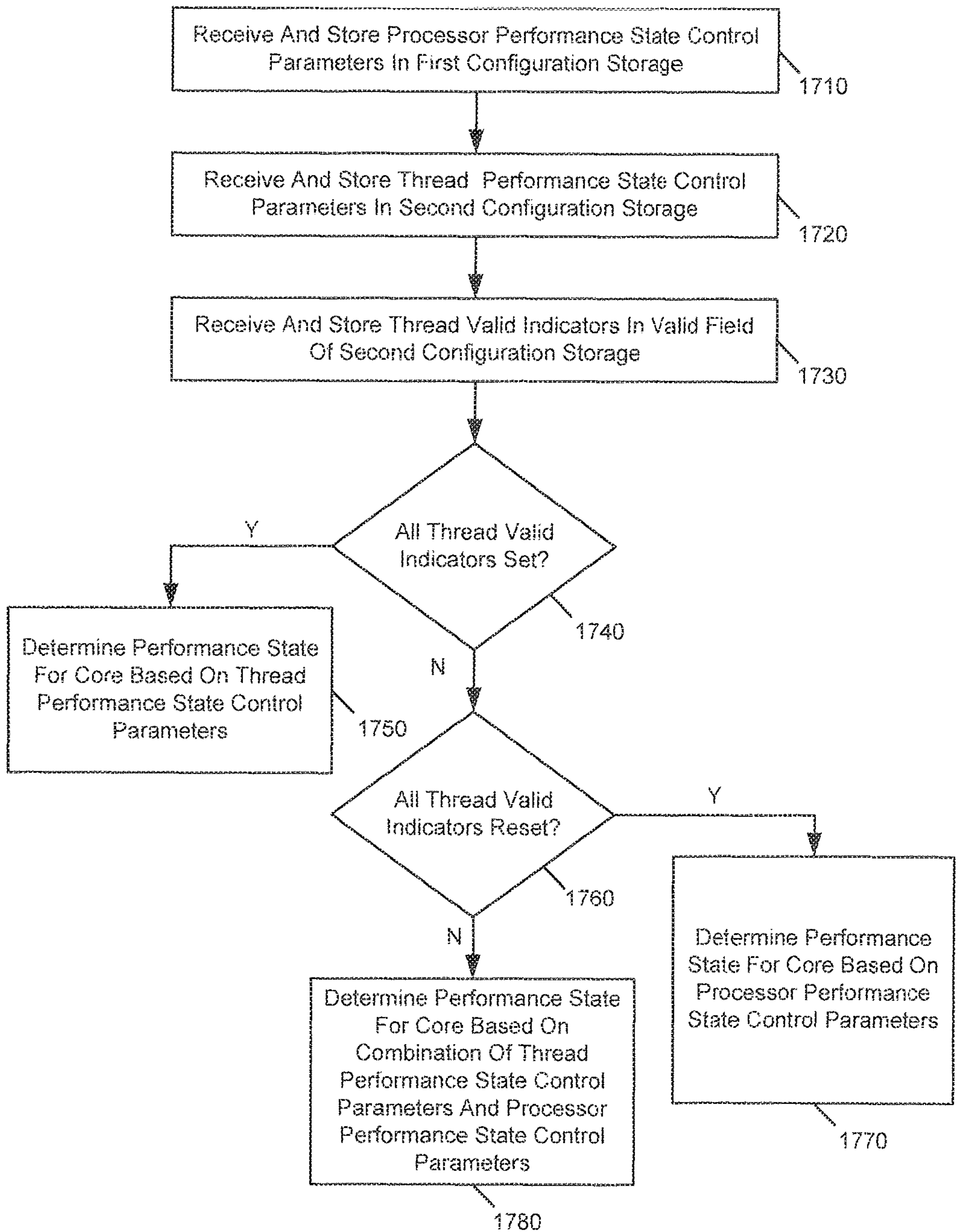
FIG. 17 is a flow diagram of a method in accordance with an embodiment of the present invention.

Referring now to FIG. 17, shown is a flow diagram of a method in accordance with an embodiment of the present invention. As shown in FIG. 17, method 1700 may be performed by a combination of hardware, software, and/or firmware, including at least portions of a power controller and related power control software, such as hardware power control circuitry, which itself may be implemented as one or more microcontrollers or other hardware control logic. As illustrated, method 1700 begins by receiving and storing processor performance state control parameters in a first configuration storage (block 1710). In one embodiment, this first configuration storage may be a MSR such as a hardware P-state request package register. These processor performance state control parameters may correspond to so-called common or package control parameters, which may be used to provide requests or hints by an OS to the power controller for use in making performance state control decisions. In an embodiment, these common processor performance state control parameters may be provided by the OS during boot operations, for example. Understand that in some cases these processor performance state control parameters may be provided and stored statically during a given boot of a platform. In other cases, one or more of these parameters may be dynamically updated during operation, e.g., due to workload changes. For this type of usage model, the static settings can be implemented via the package MSR, while the dynamic changes can be implemented via the thread level MSR.

Still referring to FIG. 17, next thread performance state control parameters can be received and stored in a second configuration storage (block 1720). In one embodiment, this second configuration storage may be another MSR such as a hardware P-state request register. In an embodiment, an OS may write thread-specific performance state control parameters into this storage, e.g., on a context switch to a new thread (and may similarly save these values with other context of the thread on another thread switch event). In addition to these values, each of which may correspond to the same parameters as in the first configuration register, a package control indicator may be stored to indicate whether these thread-specific values or the above package values are to be used.

Next, at block 1730 a plurality of thread validity indicators may be received and stored. In an embodiment, these thread validity indicators, each of which may be a single bit, may be stored in a valid field of the second configuration storage. These indicators may be set to a logic one or set state to indicate that a thread performance state control parameter stored in the corresponding field of this configuration storage is valid to be used by the power controller in determination of a performance state, in one embodiment. Of course in other embodiments these thread specific indicators may be implied or stored in another processor location.

Still referring to FIG. 17, next it can be determined whether all of these thread valid indicators are set (diamond 1740). If so (and assuming thread control is set, as described below), control passes to block 1750 where a performance state for a core or other portion of a processor on which the thread is executing may be determined based on the hints in the second configuration register. Note that a power controller may determine an appropriate power state according to a wide variety of techniques. In some cases, a table-based lookup technique can be used to apply appropriate performance state hints (from one or both of thread and OS) to identify a corresponding performance state based on the hints. Note that this performance state may correspond to a given operating frequency and operating voltage for a particular performance state, which in some cases may correspond to a given P-state of an OSPM. In other cases, based at least in part on the indicated hint information, a power controller can dynamically determine, e.g., by performance of one or more calculations, an appropriate performance state. Understand that in any case the power controller may further take into consideration constraints, including electrical constraints, thermal constraints, and power constraints, among others.

Instead if it is determined that not all of these thread valid indicators are set, control passes to diamond 1760, where it can be determined whether all of these thread valid indicators are in a reset state. Alternately, this determination may take the form of determining that the package control indicator of the second configuration register is active, meaning that a performance state is to be set based on the hints in the first configuration register (and to the exclusion of the hint information in the second configuration register).

If package control is indicated (as determined at diamond 1760), control passes to block 1770, where a performance state for a core or other portion of a processor may be set based on the hints in the first configuration register. Otherwise, control passes to block 1780 where a performance state of a core or other processor portion may be set based on a combination of hints stored in both configuration registers. That is, the power controller may use performance state control parameters stored in fields of the second configuration register for which a set thread valid indicator exists. Instead, for any fields for which the thread valid indicators are of a reset state, the performance state control parameters from the first configuration register may be used. In such way, a performance state determination is based on a combination of the configuration parameters from these two configuration registers. Understand while shown at this high level in the embodiment of FIG. 17, many variations and alternatives are possible.

Figure 18:
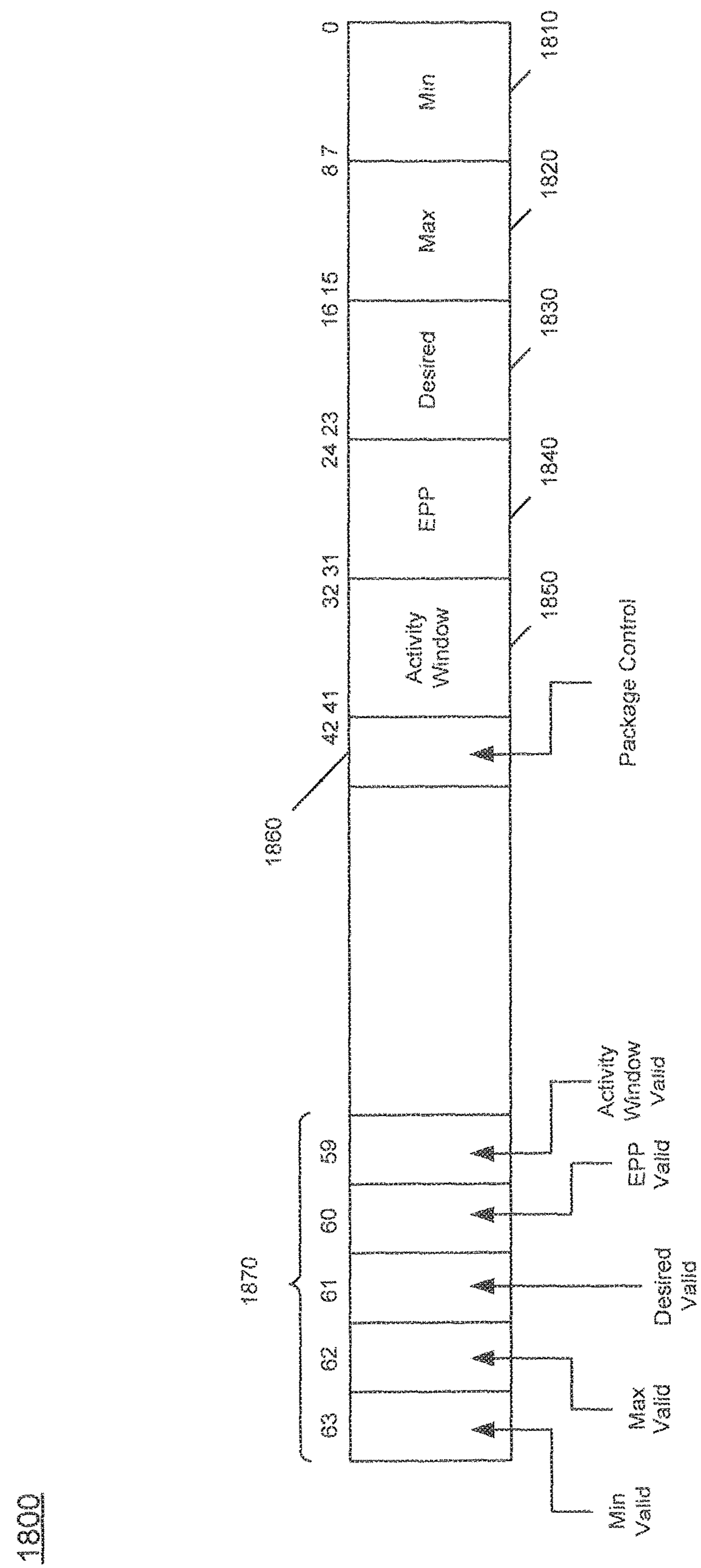
FIG. 18 is a block diagram of a configuration register in accordance with an embodiment of the present invention.

Referring now to FIG. 18, shown is a block diagram of a configuration register in accordance with an embodiment of the present invention. As shown in FIG. 18, configuration register 1800 may be an MSR that provides thread-level performance state information. More specifically, as illustrated in FIG. 18 configuration register 1800 includes a plurality of fields 1810-1850 adapted to store thread-level performance state control parameters. In addition, configuration register 1800 further includes a field 1860 for a package control indicator, which may be used to indicate whether values in fields 1810-1850 are to be used (or instead a processor-wide set of performance state control parameters are to be used). As further illustrated, configuration register 1800 also includes a valid field 1870, which stores a plurality of individual thread validity indicators to indicate whether a corresponding value stored in one of fields 1810-1850 is to be used, when a combination of performance state control parameters of this thread-level storage and a processor-wide set of values are to be used in determining an appropriate performance state for a processor. While configuration register 1800 is shown as including particular fields, understand that additional or different fields are possible in other embodiments. And furthermore, the arrangement of fields within this configuration storage can be implemented in other manners.

As illustrated, field 1810 may store a minimum performance value, which conveys a minimum performance hint to achieve a required QoS or to meet a service level agreement (SLA) as needed. Note that an excursion below the level specified may be possible due to hardware constraints.

Field 1820 may store a maximum performance value, which conveys a hint to limit the maximum performance that is expected to be supplied. Excursions above the limit requested by OS may be possible due to hardware coordination between processor cores and other components in the processor.

Field 1830 may store a desired performance value to convey a hint that, when set to zero, causes the hardware to autonomously determine a performance target. When set to a non-zero value (e.g., between a range of lowest performance and highest performance), this field conveys an explicit performance request hint to the hardware, effectively disabling hardware autonomous selection. In one embodiment, the desired performance input can be non-constraining in terms of performance and energy efficiency optimizations, which are independently controlled. The default value of this field is zero, in an embodiment.

Field 1840 may store an energy performance preference value to convey a hint within a range of values (from performance preference to energy efficiency preference) to influence the rate of performance increase/decrease and the result of the hardware's energy efficiency and performance optimizations.

Field 1850 may store an activity window value to convey a hint to specify a moving workload history observation window for performance/frequency optimizations. Combined with the energy performance preference input, this activity window value influences the rate of performance increase/decrease.

Finally, a package control indicator may be stored in field 1860, also referred to as processor control indicator, which when set causes a performance state determination for the associated thread to be based on the package performance state configuration parameters (instead of any hint information in configuration register 1800).

As further illustrated in FIG. 18, a valid field 1870 includes a plurality of valid indicators, each associated with one of fields 1810-1850. In an embodiment, these thread validity indicators may be set by an OS when the corresponding hint information is written into configuration register 1800. And in this embodiment, a set state of a given thread validity indicator indicates that the power controller is to use the corresponding hint in the given field in determination of an appropriate power state (assuming that the package control indicator stored in field 1860 is reset). However, understand that these valid indicators or bits also may be implicit, such that instead of an actual bit, a special value (e.g., zero) may serve as a valid bit.

Figure 19:
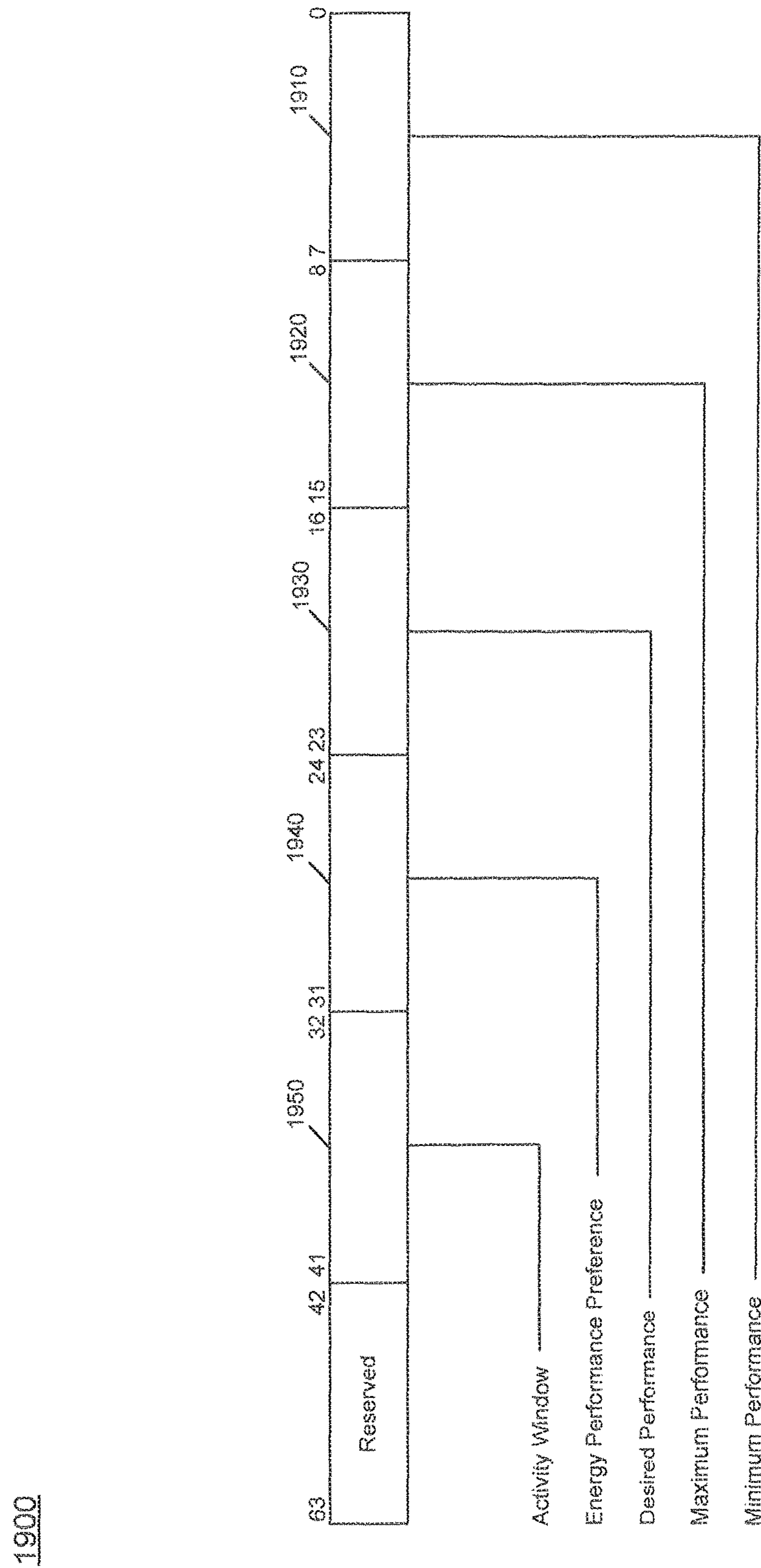
FIG. 19 is a block diagram of another configuration register in accordance with an embodiment of the present invention.

Referring now to FIG. 19, shown is a block diagram of another configuration register in accordance with an embodiment of the present invention. As shown in FIG. 19, configuration register 1900 may be an MSR that provides processor-level performance state information. As shown in FIG. 19, a common control for providing package-wide level hints/constraints for autonomous performance state operation may be provided by the OS and stored in configuration register 1900. Note that configuration register 1900 may have the same structure as configuration register 1800 having fields 1910-1950, with the exception of the package control field (and valid field), which does not exist in configuration register 1900. Field values written to this MSR apply to all logical processors within the physical package, with the exception of logical processors having a reset (e.g., logic zero) package control indicator, as described herein. High order bits of configuration register 1900 may be reserved in an embodiment. Note that a power controller may clip and resolve field values as appropriate to a valid range.

The OS may override a PCU's autonomous selection of performance state with a specific performance target by setting the desired performance field to a non-zero value. However, the effective frequency delivered may be subject to the result of energy efficiency and performance optimizations, which are influenced by the energy performance preference field. In an embodiment, software may disable all hardware optimizations by setting the minimum performance value equal to the maximum performance value (subject to package coordination). Note the processor may run below a minimum performance level due to hardware constraints including power, thermal, and package coordination constraints.

Figure 20:
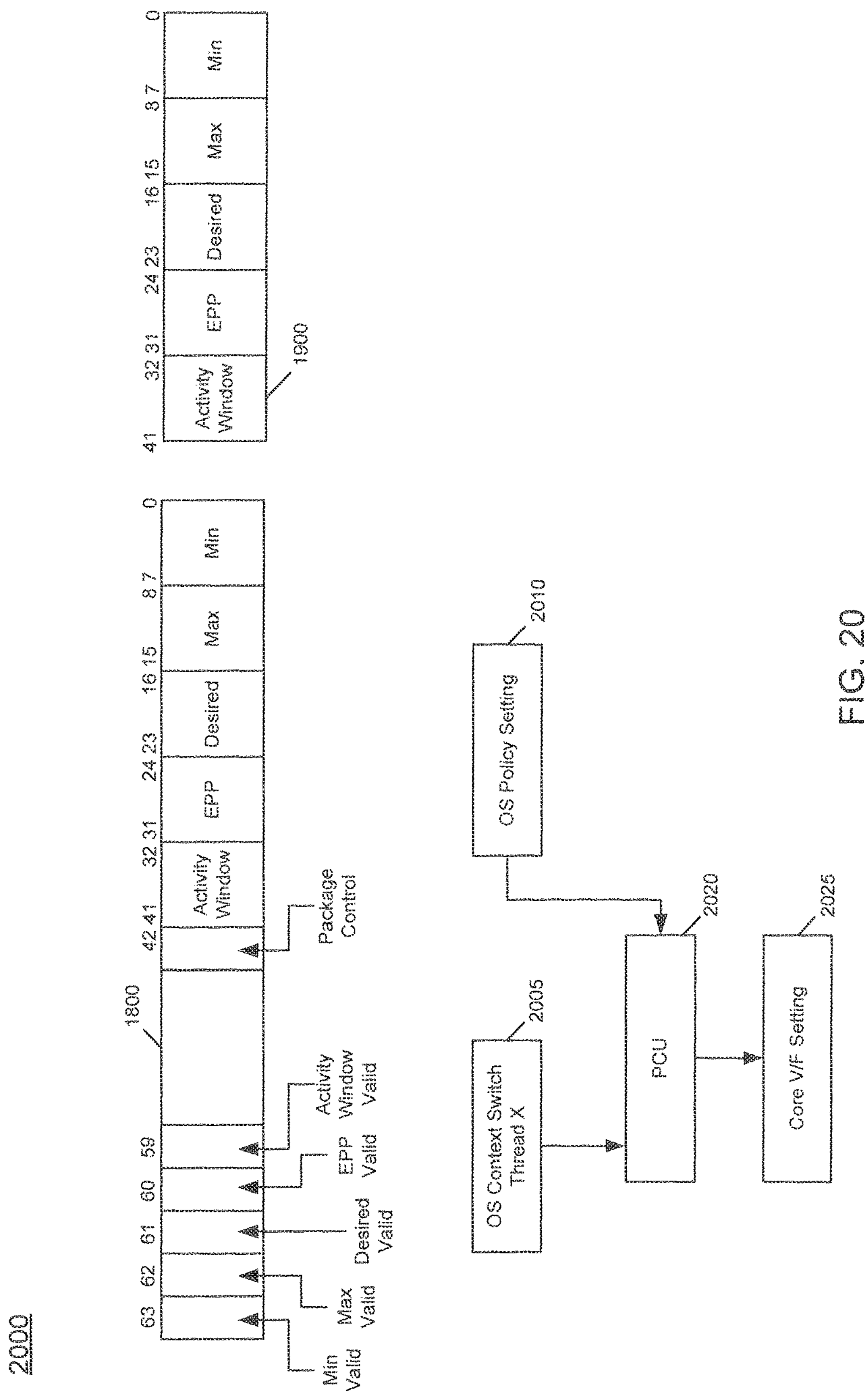
FIG. 20 is a block diagram of a portion of a processor in accordance with an embodiment.

Referring now to FIG. 20, shown is a block diagram of a portion of a processor in accordance with an embodiment. As seen, processor 2000 includes configuration registers as described above. More specifically, with reference back to FIGS. 18 and 19, processor 2000 includes a first configuration register 1800, which may store thread-specific performance state control parameters and corresponding valid indicators, and a second configuration register 1900, which may store package performance state control parameters, e.g., as provided by an OS.

As further illustrated in FIG. 20, a power control unit 2020 is provided. PCU 2020 receives incoming information from these configuration registers. More specifically, an OS, via an OS communication mechanism 2010, provides the OS policy settings from second configuration register 1900. In turn, via another OS mechanism 2005, on a context switch thread-specific values from first configuration register 1800 are provided.

By way of the various performance state configuration parameters and the controls identified in first configuration register 1800 (namely the package control indicator and, if applicable, the individual thread valid indicators), a combination of thread-level and OS-level hints may be received and used by PCU 2020 to determine an appropriate performance state for application to one or more cores. Thus as seen, PCU 2020 provides a core voltage/frequency setting 2025 and other types of SoC and platform power controls like core duty cycles. More specifically, setting 2025 may include a voltage identifier (VID) to be sent to a voltage regulator to cause the voltage regulator to output the requested operating voltage. In turn, the frequency setting of setting 2025 may be provided to one or more clock generation circuits to enable generation of one or more clock signals for provision to one or more cores or portions thereof. For example other usage models and thread/package combinations are possible such as providing at boot time package level controls, including static and reset values and then dynamic changes are done by the thread for a given subset of the request fields.

Understand while shown at this high level in the embodiment of FIG. 20, many variations and alternatives are possible.

The following examples pertain to further embodiments.

In an example, a processor includes: a plurality of cores to execute a plurality of threads; a first storage to store a first set of processor performance state control parameters associated with the processor, the first set of processor performance state control parameters for use in determination of a performance state for at least a portion of the processor; a second storage to store a second set of performance state control parameters associated with a first thread, the second set of performance state control parameters for use in determination of a performance state for a first portion of the processor on which the first thread is to execute; and a power controller to control the performance state of the first portion of the processor according to a combination of one or more of the first set of processor performance state control parameters and one or more of the second set of performance state control parameters, based on a thread selection indicator.

In an example, the thread selection indicator comprises a valid field of the second storage.

In an example, the valid field comprises a plurality of valid indicators each associated with a performance state control parameter of the second set of performance state control parameters.

In an example, the second storage further comprises a processor control indicator, and the power controller is to control the performance state of the processor according to the first set of processor performance state control parameters when the processor control indicator is of a first state.

In an example, based at least in part on at least one of the plurality of the valid indicators, the power controller is to control the performance state of the first portion of the processor according to at least one of the second set of performance state control parameters.

In an example, the power controller is to: control the performance state of the first portion of the processor according to the second set of performance state control parameters when the plurality of valid indicators are of a first state; and control the performance state of the first portion of the processor according to the first set of processor performance state control parameters when the plurality of valid indicators are of a second state.

Note that the above processor can be implemented using various means.

In an example, the processor comprises a SoC incorporated in a user equipment touch-enabled device.

In another example, a system comprises a display and a memory, and includes the processor of one or more of the above examples.

In another example, a method comprises: storing, in a first configuration storage of a processor, processor performance state hints, the processor performance state hints associated with an operating system; storing, in a second configuration storage of the processor, thread performance state hints, the thread performance state hints associated with a first thread; and storing, in the processor, a plurality of valid indicators associated with the thread performance state hints.

In an example, the method further comprises determining a performance state for a first processing engine on which the first thread executes based on a combination of the processor performance state hints and the thread performance state hints.

In an example, the method further comprises: determining the performance state for the first processing engine based on the thread performance state hints when the plurality of valid indicators are of a first state; and determining the performance state for the first processing engine based on the processor performance state hints when the plurality of valid indicators are of a second state.

In an example, the method further comprises determining the performance state for the first processing engine based on the processor performance state hints when a package control indicator of the second configuration storage is of a first state.

In an example, the method further comprises: setting the processor performance state hints via at least one of the operating system and a basic input/output system; and setting the thread performance state hints via a user application.

In an example, the method further comprises storing the thread performance state hints in the second configuration storage on a context switch to the first thread, and storing the thread performance state hints with a context of the first thread on a context switch from the first thread.

In an example, the method further comprises: controlling the first processing engine to have a first performance state during execution of the first thread based on at least one of the thread performance state hints; and controlling the first processing engine to have a second performance state during execution of a second thread based one or more thread performance state hints associated with the second thread, the second performance state a lower performance state than the first performance state, the first thread comprising a real-time thread and the second thread comprising a background thread.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In another example, a system comprises: a processor having a plurality of cores, at least one of the plurality of cores to execute in a multi-threaded mode. The processor further includes: a first storage to store a set of common performance state request settings; a second storage to store a set of thread performance state request settings; and a controller to control a performance state of a first core based on a combination of at least one of the set of common performance state request settings and at least one of the set of thread performance state request settings. The system may further include at least one voltage regulator coupled to the processor.

In an example, the controller is to control the performance state of the first core based on the combination when a package control indicator of the second storage is of a second state.

In an example, the controller is to control the performance state of the first core based on the combination further when one or more of a plurality of valid indicators associated with the set of thread performance state request settings are of a first state.

In an example, the controller is to control the performance state of the first core based on the set of common performance state request settings when the package control indicator of the second storage is of a first state.

In an example, the at least one of the set of thread performance state settings comprises at least one of a minimum performance request of a thread and an energy performance preference of the thread, the thread to execute on the first core.

In an example, the processor is to store the set of thread performance state request settings in the second storage in response to a restore instruction and to save the set of thread performance state request settings to a memory in response to a save instruction.

In another example, an apparatus comprises: first means for storing processor performance state hints, the processor performance state hints associated with an operating system; second means for storing thread performance state hints, the thread performance state hints associated with a first thread; and means for determining a performance state for a first processing means on which the first thread executes based on a combination of the processor performance state hints and the thread performance state hints.

In an example, the apparatus further comprises third means for storing a plurality of valid indicators associated with the thread performance state hints. The means for determining may determine the performance state for the first processing engine based on the thread performance state hints when the plurality of valid indicators are of a first state and determine the performance state for the first processing engine based on the processor performance state hints when the plurality of valid indicators are of a second state.

In an example, the apparatus further comprises: first setting means for setting the processor performance state hints; and second setting means for setting the thread performance state hints.

In an example, the apparatus further comprises: means for controlling the first processing engine to have a first performance state during execution of the first thread based on at least one of the thread performance state hints; and means for controlling the first processing engine to have a second performance state during execution of a second thread based one or more thread performance state hints associated with the second thread, the second performance state a lower performance state than the first performance state, the first thread comprising a real-time thread and the second thread comprising a background thread.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments, may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:

a plurality of cores to execute a plurality of threads;

a first storage having a first set of fields to store a first set of processor performance state control parameters associated with the processor, the first set of processor performance state control parameters to convey hints for use in determination of a performance state for at least a portion of the processor;

a second storage having the first set of fields to store a second set of performance state control parameters associated with a first thread, the second set of performance state control parameters corresponding to the same parameters as the first set of processor performance state control parameters and to convey hints for use in determination of a performance state for a first portion of the processor on which the first thread is to execute; and a power controller to autonomously control the performance state of the first portion of the processor according to a combination of one or more of the first set of processor performance state control parameters and one or more of the second set of performance state control parameters, based on a thread selection indicator to indicate that the power controller is to use the one or more of the second set of performance state control parameters to control the performance state of the first portion of the processor.

2. The processor of claim 1, wherein the thread selection indicator comprises a valid field of the second storage.

3. The processor of claim 2, wherein the valid field comprises a plurality of valid indicators each associated with a performance state control parameter of the second set of performance state control parameters.

4. The processor of claim 3, wherein the second storage further comprises a processor control indicator, and wherein the power controller is to control the performance state of the processor according to the first set of processor performance state control parameters and not according to any of the second set of performance state control parameters when the processor control indicator is of a first state.

5. The processor of claim 3, wherein based at least in part on at least one of the plurality of the valid indicators, the power controller is to control the performance state of the first portion of the processor according to at least one of the second set of performance state control parameters.

6. The processor of claim 5, wherein the power controller is to:

control the performance state of the first portion of the processor according to the second set of performance state control parameters when the plurality of valid indicators are of a first state; and control the performance state of the first portion of the processor according to the first set of processor performance state control parameters when the plurality of valid indicators are of a second state.

7. A non-transitory machine-readable medium having stored thereon instructions, which if performed by a machine cause the machine to perform a method comprising:

storing, in a first plurality of fields of a first configuration storage of a processor, processor performance state hints, the processor performance state hints associated with an operating system and to convey hint information for use in determination of a performance state for at least a portion of the processor;

storing, in a first plurality of fields of a second configuration storage of the processor, thread performance state hints, the thread performance state hints associated with a first thread and to convey hint information for use in determination of a performance state for a first processing engine of the processor on which the first thread is to execute;

storing, in the processor, a plurality of valid indicators associated with the thread performance state hints;

determining autonomously, via a power controller of the processor, the performance state for the first processing engine on which the first thread executes based on a combination of the processor performance state hints and the thread performance state hints; and controlling, via the power controller, the first processing engine to operate at the performance state.

8. The non-transitory machine-readable medium of claim 7, wherein the method further comprises:

determining the performance state for the first processing engine based on the thread performance state hints when the plurality of valid indicators are of a first state; and determining the performance state for the first processing engine based on the processor performance state hints when the plurality of valid indicators are of a second state.

9. The non-transitory machine-readable medium of claim 7, wherein the method further comprises determining the performance state for the first processing engine based on the processor performance state hints when a package control indicator of the second configuration storage is of a first state.

10. The non-transitory machine-readable medium of claim 7, wherein the method further comprises:

setting the processor performance state hints via at least one of the operating system and a basic input/output system; and setting the thread performance state hints via a user application.

11. The non-transitory machine-readable medium of claim 7, wherein the method further comprises storing the thread performance state hints in the second configuration storage on a context switch to the first thread, and storing the thread performance state hints with a context of the first thread on a context switch from the first thread.

12. The non-transitory machine-readable medium of claim 7, wherein the method further comprises:

controlling the first processing engine to have a first performance state during execution of the first thread based on at least one of the thread performance state hints; and controlling the first processing engine to have a second performance state during execution of a second thread based one or more thread performance state hints associated with the second thread, the second performance state a lower performance state than the first performance state, the first thread comprising a real-time thread and the second thread comprising a background thread.

13. A system comprising:

a processor having a plurality of cores, at least one of the plurality of cores to execute in a multi-threaded mode, the processor further including:

a first storage having a first set of fields to store a set of common performance state request settings to convey hints for use in determination of a performance state for at least a portion of the processor;

a second storage having the first set of fields to store a set of thread performance state request settings to convey hints for use in determination of a performance state for a first core of the processor on which a thread is to execute; and a controller to autonomously determine and control the performance state of the first core based on a combination of at least one of the set of common performance state request settings and at least one of the set of thread performance state request settings; and at least one voltage regulator coupled to the processor.

14. The system of claim 13, wherein the controller is to control the performance state of the first core based on the combination when a package control indicator of the second storage is of a second state to indicate that the controller is to use the at least one of the set of thread performance state request settings to control the performance state of the first core.

15. The system of claim 14, wherein the controller is to control the performance state of the first core based on the combination further when one or more of a plurality of valid indicators associated with the set of thread performance state request settings are of a first state.

16. The system of claim 14, wherein the controller is to control the performance state of the first core based on the set of common performance state request settings when the package control indicator of the second storage is of a first state.

17. The system of claim 13, wherein the at least one of the set of thread performance state settings comprises at least one of a minimum performance request of the thread and an energy performance preference of the thread.

18. The system of claim 13, wherein the controller is to control the performance state of the first core further based on one or more constraints.

19. The system of claim 13, wherein the processor is to store the set of thread performance state request settings in the second storage in response to a restore instruction and to save the set of thread performance state request settings to a memory in response to a save instruction.

* * * * *